Figure 3C:
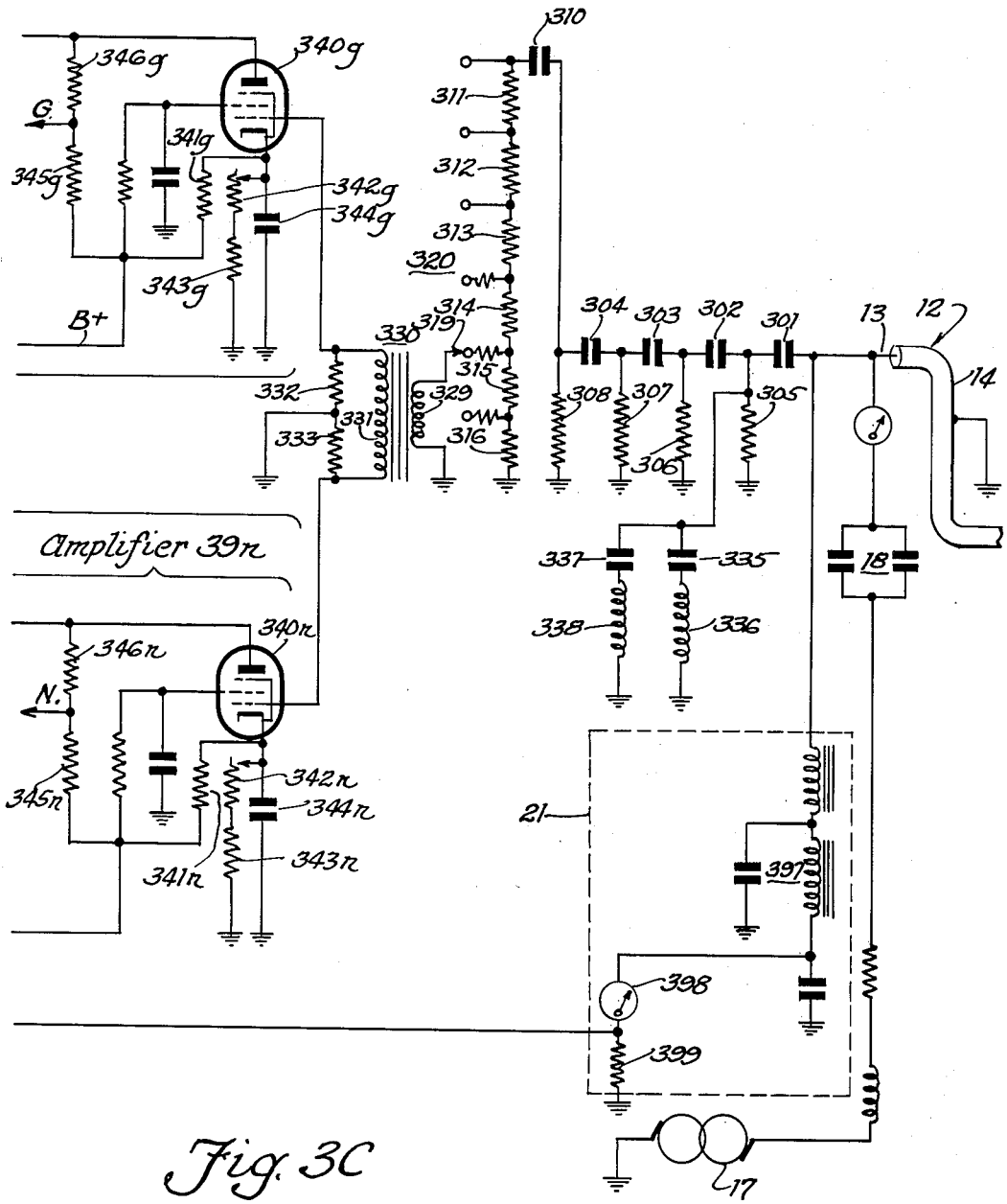

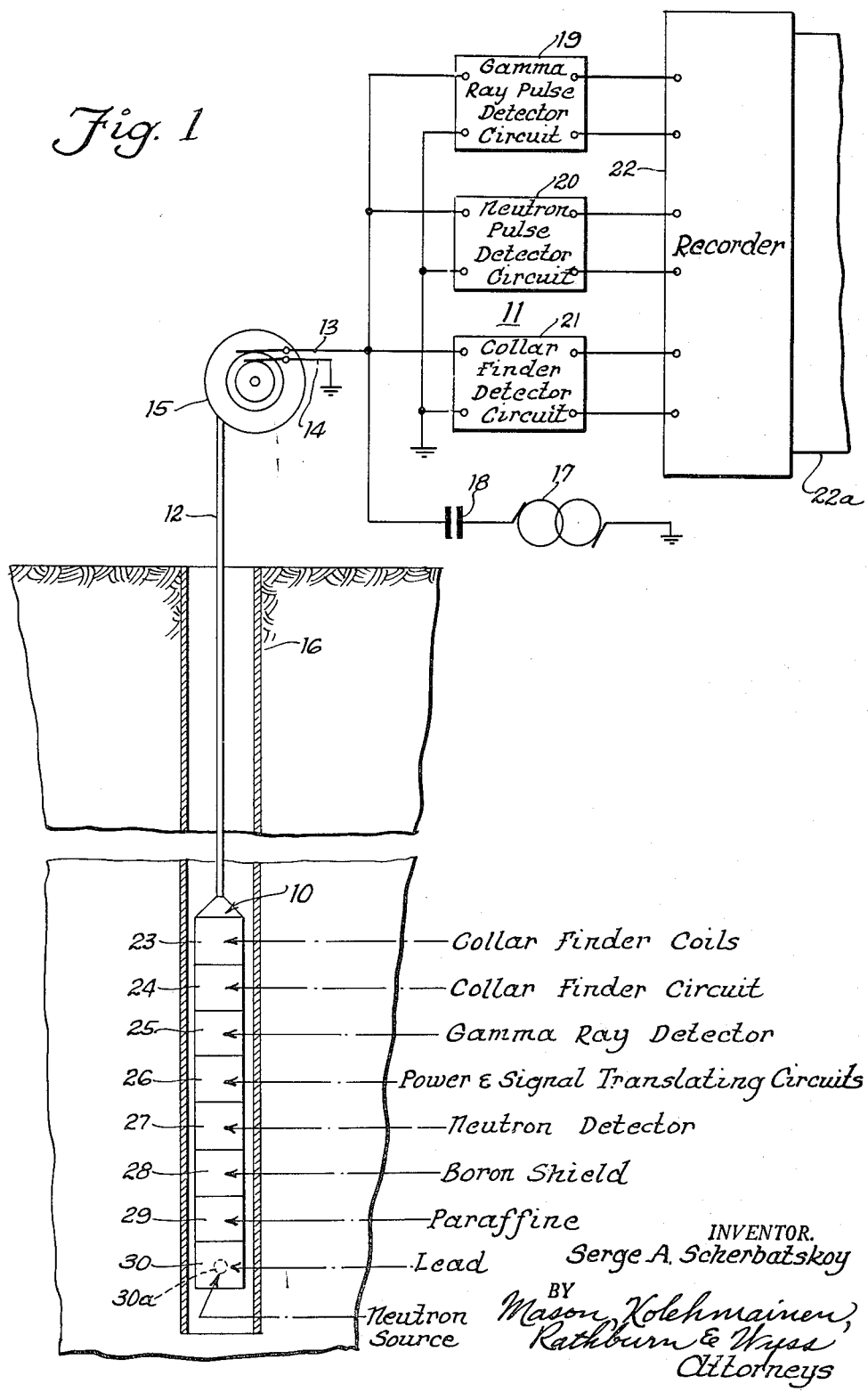

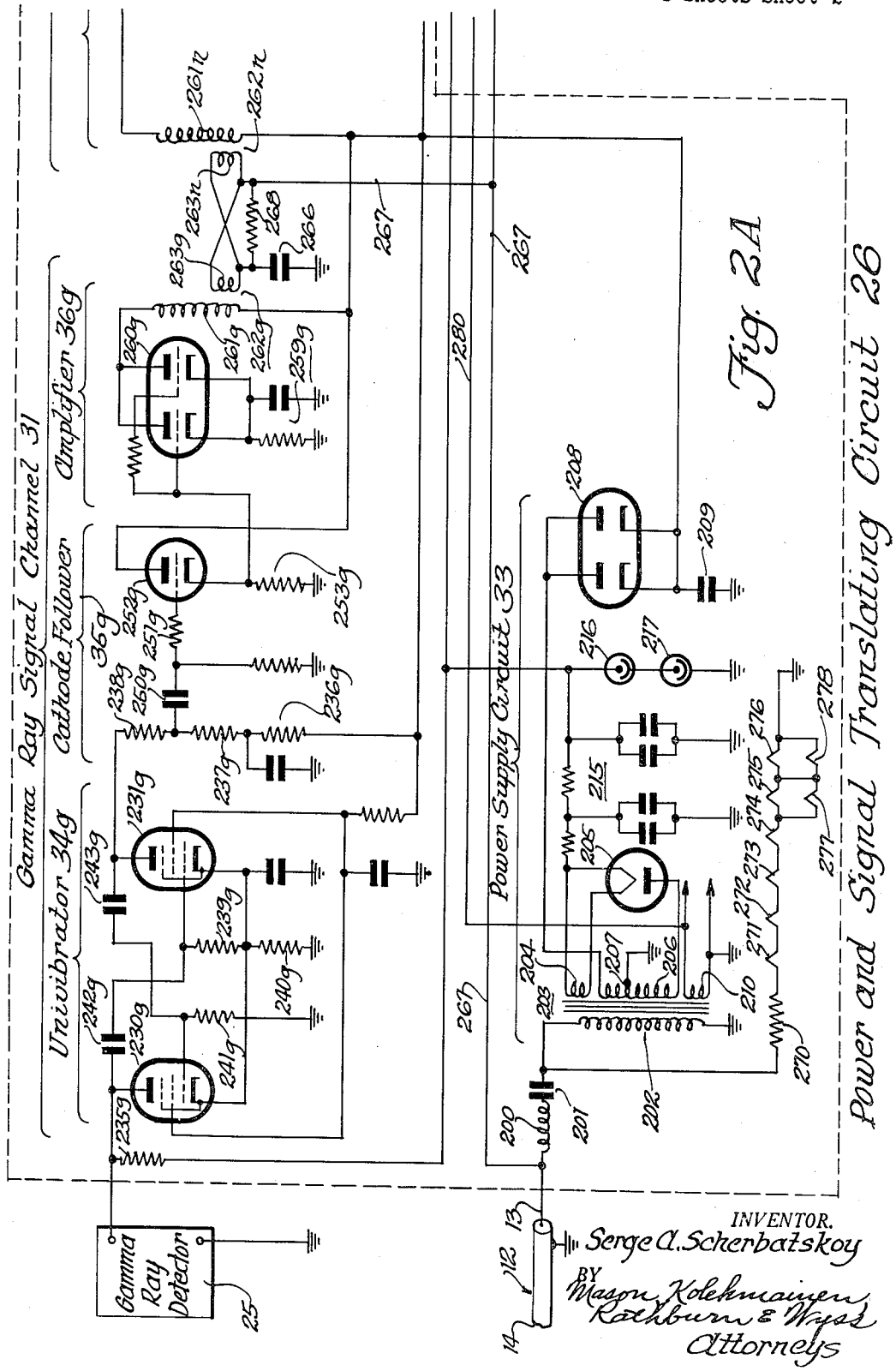

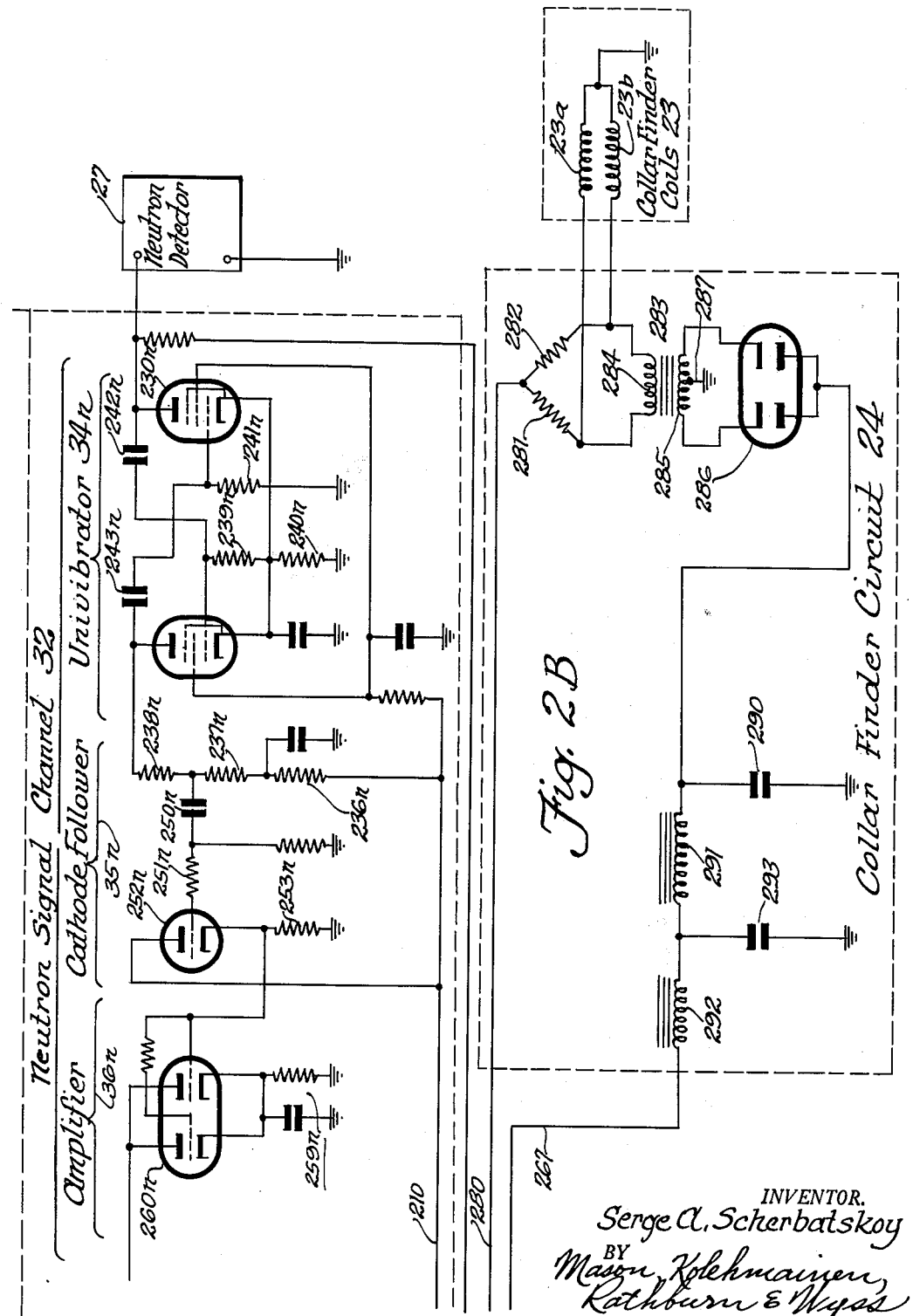

March 27, 1956  S. A. SCHERBATSKOY  2,740,053
RADIATION WELL LOGGING SYSTEM
Filed Jan. 12, 1951  8 Sheets-Sheet 4
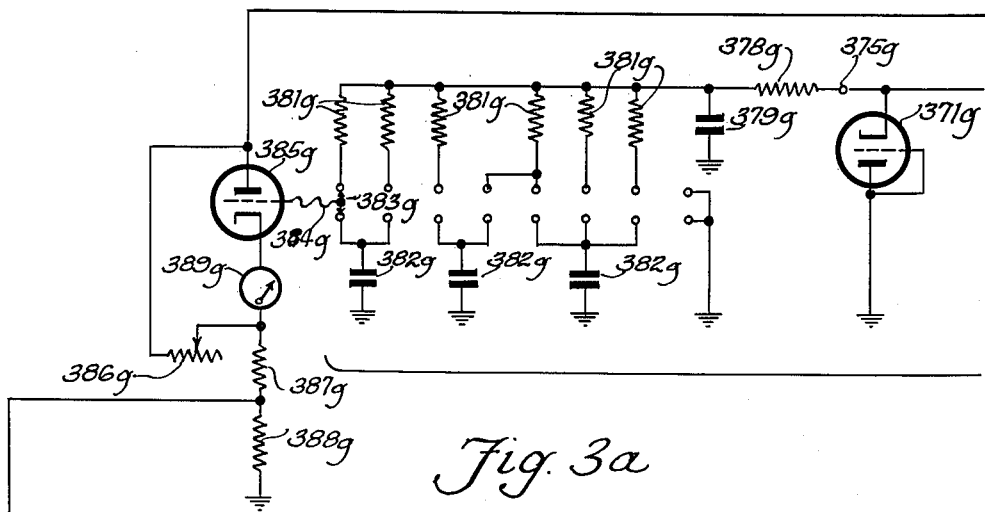
Fig. 3a
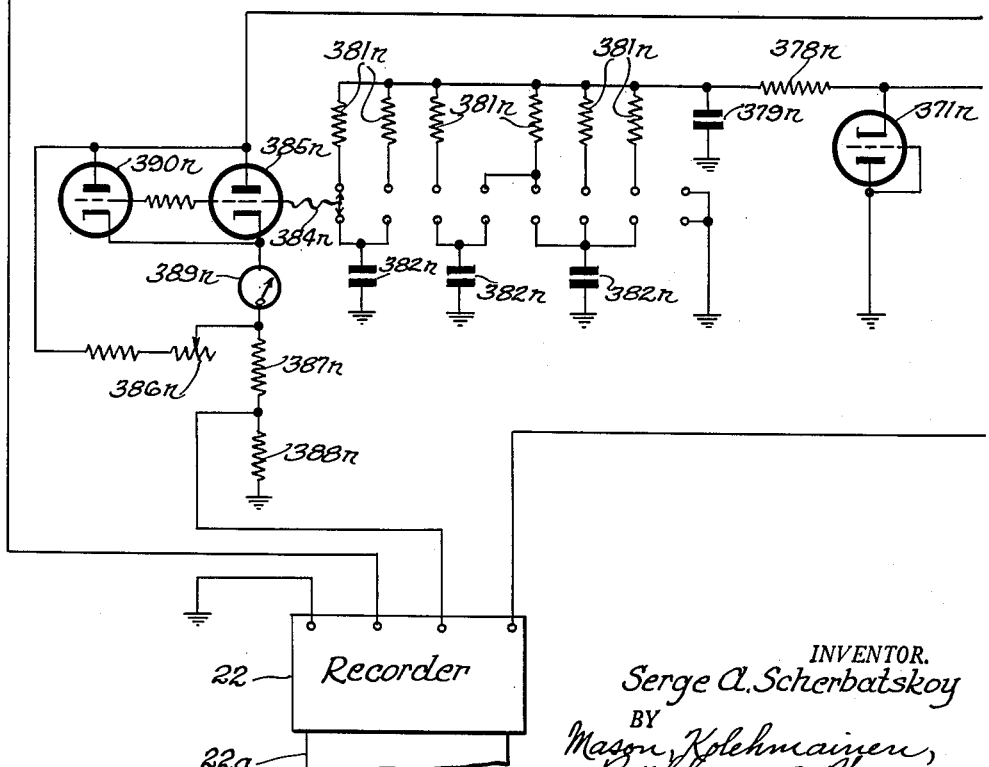
INVENTOR.
Serge A. Scherbatskoy
BY
Mason, Kolehmainen,
Rathburn & Wyss
Attorneys

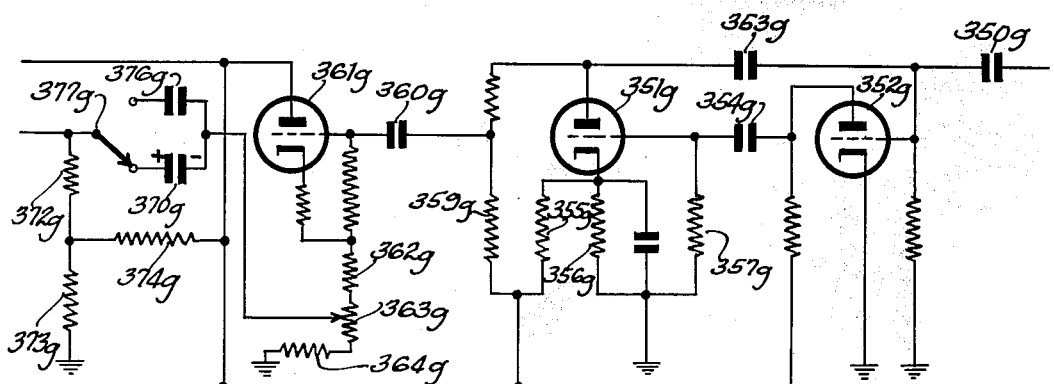
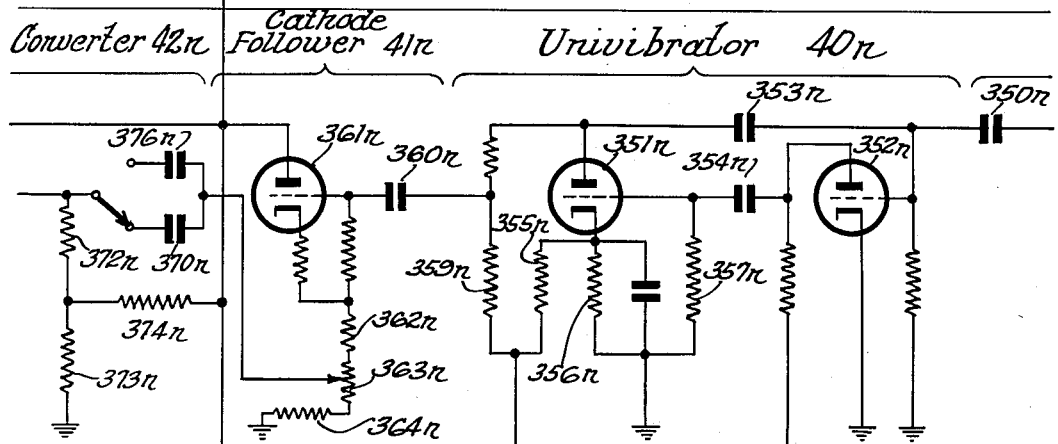
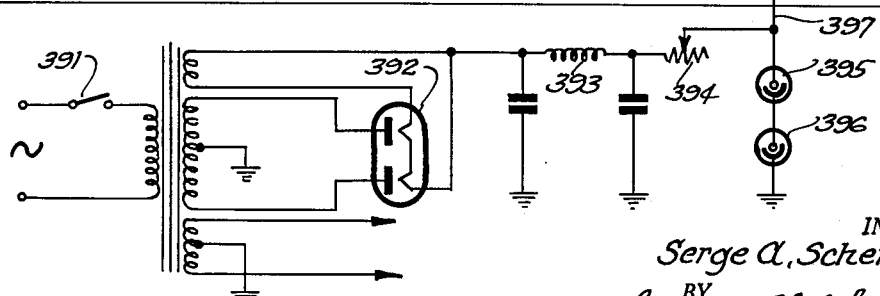
Fig. 3B

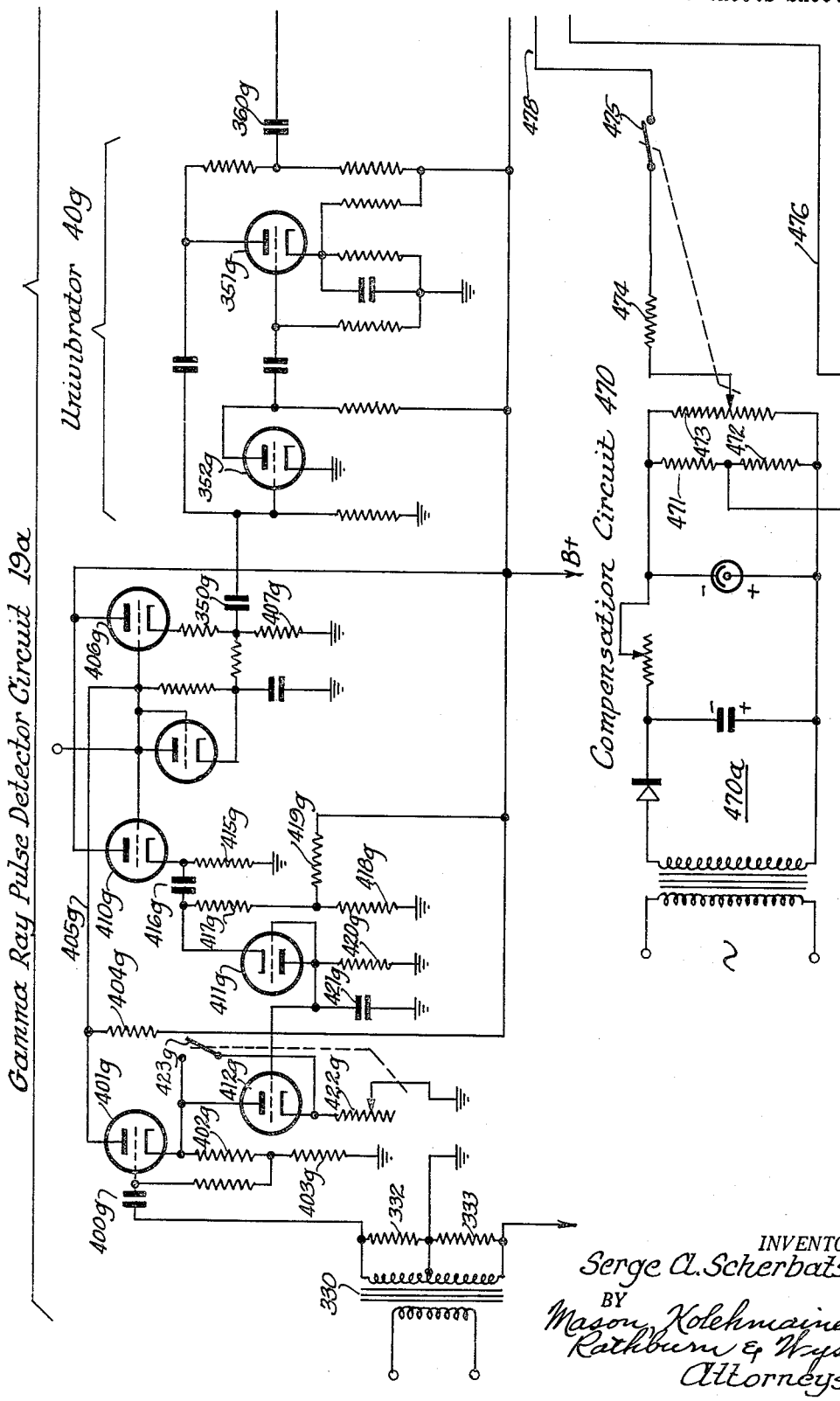

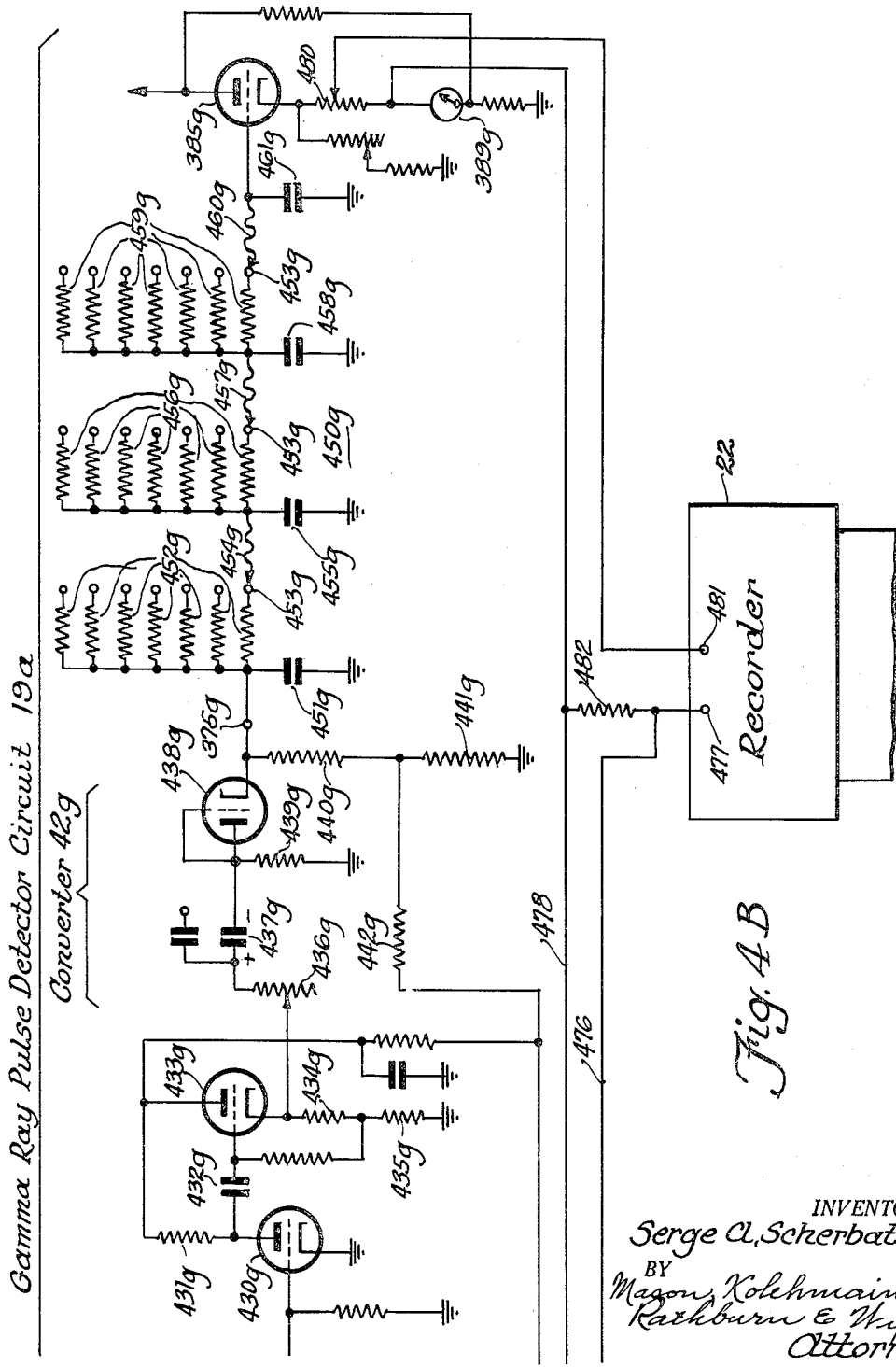

United States Patent Office 2,740,053
Patented Mar. 27, 1956

2,740,053

RADIATION WELL LOGGING SYSTEM

Serge A. Scherbatskoy, Tulsa, Okla., assignor to Perforating Guns Atlas Corporation, Houston, Tex., a corporation of Delaware Application January 12, 1951, Serial No. 205,616

34 Claims. (Cl. 250—83.6)

The present invention relates to radioactivity well logging and, more particularly, to a radioactivity well logging system for simultaneously obtaining a neutron log and a gamma ray log together with a correlated collar log.

In the art of radioactivity well logging, two types of logging systems are in general use. When using systems of the first type, a gamma ray log is obtained wherein the intensity of gamma rays emitted naturally from subsurface formations is logged. In using systems of the second type, an artificial neutron source and a neutron detector are lowered into the bore-hole and the relative absorption of neutrons in the surrounding subsurface formations is logged. In general, the gamma ray logging system permits identification of formation, or stratigraphy, which is impossible to obtain with a neutron logging system. Type formations such as highly radioactive shales or low value limestones and sandstones afford excellent markers for gamma ray log correlations. However, fluid, gas within the formation, the fluid level within the borehole and possible porosity of the subsurface formation are not indicated in the gamma ray log, but may be obtained by a neutron log of the same formation. On the other hand, analysis of the information given by the neutron log alone sometimes leads to erroneous results because no distinction can be made between porous zones and shale formations which contain a high percentage of connate water. It is, therefore, necessary to combine the gamma ray log with the neutron log in order that the stratigraphy and possible pay zones may be accurately correlated.

In such situations it is extremely desirable to produce both logs simultaneously so that correlated gamma ray and neutron information is obtained in a single operation. However, if both gamma rays and neutrons are to be measured in a common subsurface unit, the problem arises of preventing the gamma ray detector from falsely responding to neutrons emanating from the neutron source in the subsurface unit. While certain neutron sources are available which emit very few gamma rays, such as, for example, radium D or polonium beryllium, these sources either have too short a half life or are too expensive to be commercially acceptable. On the other hand, a low cost neutron source having a long half life, such as radium beryllium, is a very powerful gamma ray emitter, and it would be expected that at least a one hundred foot spacing between the neutron source and gamma ray detector would be required in order to prevent the neutron source from unduly affecting the output of the gamma ray detector.

With either the gamma ray log or the neutron log, it is necessary to obtain accurate depth measurements both for the purpose of correlating the two logs and for the purpose of checking previous depth measurements. Of the conventional depth measuring methods, the collar logging method is generally considered the most accurate; such devices as the depth measuring sheave, etc., being inaccurate due to stretching of the supporting cable as the apparatus is lowered into the hole. It would be desirable, therefore, to provide facilities for obtaining a simultaneous neutron and gamma ray log together with a collar position log and to employ only a single conductor armored cable to raise and lower the apparatus, to supply power to the subsurface equipment and to transmit all of the logging information from the subsurface equipment to the surface equipment. Such a cable is easy to handle, is inexpensive and may be constructed to withstand the weight of many thousands of feet of its own length.

Accordingly, it is an object of the present invention to provide a new and improved borehole logging system for simultaneously producing a neutron log and a gamma ray log of a borehole.

It is another object of the present invention to provide a new and improved radioactivity well logging system for simultaneously producing a neutron log, and a gamma ray log and a collar position log.

It is a further object of the present invention to provide new and improved borehole logging apparatus for simultaneously producing neutron and gamma ray logs, in which a single cable, preferably comprising a single insulated conductor, is used to lower apparatus into the borehole, to convey all of the logging information to the surface equipment and also to supply power to the subsurface apparatus.

It is a still further object of the present invention to provide new and improved borehole logging apparatus for simultaneously producing a combined neutron and gamma ray log together with a correlated collar position log, in which a single cable, preferably comprising a single insulated conductor, is used to lower the apparatus into the borehole, to convey all of the logging information to the surface equipment and also to supply electrical power to the subsurface apparatus.

Another object of the present invention resides in the provision in a simultaneous neutron and gamma ray well logging system of a new and improved subsurface unit wherein neutron and gamma ray pulses are coupled to the single conductor of the cable which is used to lower the unit into the borehole without producing ringing transients in the coupling means.

Still another object of the present invention resides in the provision of new and improved surface equipment adapted for use in a combined neutron, gamma ray and collar position borehole logging system.

The invention, both as to its organization and method of operation, together with further objects and advantages thereof, will best be understood by reference to the following specification taken in connection with the accompanying drawings in which:

Fig. 1 diagrammatically illustrates combined neutron, gamma ray and collar position logging apparatus characterized by the features of the present invention;

Figs. 2A and 2B schematically illustrate the subsurface equipment of the present improved logging apparatus;

Figs. 3A, 3B and 3C schematically illustrate the surface equipment of the present improved logging apparatus; and Figs. 4A and 4B schematically illustrate an alternative form of surface equipment which may be employed in the logging system shown in Fig. 1.

Referring now the drawings and more particularly to Fig. 1 thereof, the simultaneous neutron gamma ray and collar position logging apparatus there illustrated generally comprises a subsurface unit 10 and a surface unit 11 interconnected by means of a single conductor coaxial cable 12. The arrangement illustrated is particularly adapted for the production of simultaneous neutron and gamma ray logs of boreholes traversed by the subsurface unit 10.

In general, the subsurface equipment 10 comprises collar finder coils 23, a collar finder circuit 24, a gamma ray detector 25, power and signal translating circuits 26, a neutron detector 27, a boron shield 28, a paraffin spacer 29 and a mass of lead 30 within which is positioned a suitable neutron source 30a.

The component units 23—30 are all housed within a sealed housing having the requisite physical strength to withstand the fluid pressures encountered and are preferably located in the housing in the particular order illustrated. The unit 10 is arranged to be lowered into the borehole by means of the cable 12 which preferably is of the coaxial type and comprises a center conductor 13 surrounded by and insulated from an armored sheath 14. This sheath is appropriately grounded at the earth's surface and an alternating current generator 17, forming a part of the surface equipment 11 and coupled to the cable conductor 13 through the blocking condenser 18, is utilized to supply power over the cable 12 to the subsurface unit 10. As will be understood by those skilled in the art, the cable 12 extends into the borehole and is carried on a suitable power operated drum 15 located at the earth's surface. Conventional drive facilities may be provided for rotating the drum 15 in either direction whereby the cable 12 may be fed into or reeled out of the borehole so as to move the subsurface equipment 10 longitudinally of the borehole. In the particular arrangement illustrated in Fig. 1, the borehole is lined with the usual ferrous metal casing 16 which is provided with collar coupling elements, not shown, along the length thereof. These elements have the effect of increasing the wall thickness of the casing at evenly spaced points along the length of the casing and hence serve as casing section markers.

Generally considered, the surface equipment 11 comprises a gamma ray pulse detector circuit 19, a neutron pulse detector circuit 20, a collar finder detector circuit 21 and a recorder 22 which is preferably of the commercial type known as the Speed-O-Max, manufactured by the Leeds and Northrop Company of Philadelphia, Pennsylvania. Specifically, the output circuits of the units 19, 20 and 21 are connected to the recording instrument 22 which operates to produce on the record strip 22a a continuous graph of both the neutron and gamma ray signals transmitted to the equipment 11 from the subsurface equipment 10. The recorder 22 also responds to the signals supplied by the detector circuit 21 to produce record indications on the strip 22a identifying the positions of the casing collars so that a correlated neutron, gamma ray and depth measurement log is obtained.

Briefly, to consider the general mode of operation of the simultaneous logging system shown in Fig. 1, without considering in detail the circuit arrangements of the units shown therein in block diagram form, the neutron source 30a, which is preferably a low cost source such as radium beryllium and which is a powerful emitter of neutrons, also emits gamma rays of quite high intensity. The neutrons which are emitted by the source 30a pass through the surrounding formation and are intercepted by the neutron detector 27 and cause ionization thereof. The neutron detector 27 is preferably in the form of a Geiger-Müller counter provided with a foil which becomes radioactive when bombarded by neutrons, and the counter produces pulses, the rate of occurrence of which is proportional to the intensity of the neutrons intercepted by the detector 27.

In order to improve the quality of the neutron log, the paraffin spacer 29 and the boron shield 28 are provided which are positioned between the source 30a and the neutron detector 27. The paraffin, which is a hydrogenous materials, acts as a neutron reflector and tends to direct neutrons, which have been slowed down in the environment, laterally into the formation and also slows down any epi-thermal neutrons very strongly so that the epi-thermal neutrons are then capable of absorption by the boron shield 28 which is of high cross section. Furthermore, the boron shield stops the slow neutrons. In this connection, it will be understood that the purpose of the paraffin and boron shield is to prevent the direct transmission of neutrons from the source 30a to the neutron detector 27 so that the neutrons from the source 30a must travel through the surrounding formation and enter the neutron detector 27 in a direction at least partially lateral to the axis of the borehole. The neutron detector pulses produced in the neutron detector 27 are supplied to the power and signal translating circuits 26 wherein these pulses are amplified and are standardized in amplitude and width and are supplied as pulses of a predetermined polarity to the central conductor 13 of the cable 12 for transmission to the surface equipment 11. At the surface, the neutron pulses are separated from the other signals present on the conductor 13, and are supplied to the neutron pulse detector circuit 20 where they are further amplified, standardized in amplitude and width and converted into a signal of varying amplitude which is supplied to the recorder 22.

As generally indicated above, the neutron source 30a also emits a substantial amount of high intensity gamma rays which, if intercepted by the gamma ray detector 25, would cause the gamma ray detector falsely to respond to the artificial gamma rays from the neutron source 30a. In this connection, it will be understood that the shielding effect of the units 28 and 29 is such that gamma rays as well as neutrons from the source 30a do not pass directly to the gamma ray detector 25. In addition, the absorption of the lead shield 30, which surrounds the neutron source 30a, and the mud which surrounds the sub-surface unit 10 within the borehole casing, is sufficient to prevent the gamma ray detector from falsely responding to gamma rays produced by the neutron source 30a. However, it will be understood that the gamma ray detector 25 is preferably positioned a substantial distance away from the neutron source 30a. The gamma ray detector 25 is preferably of the Geiger-Müller counter type, and gamma rays which are intercepted by the detector 25 produce pulses in the output circuit thereof, the rate of occurrence of which is proportional to the intensity of the detected gamma rays. The pulses produced in the manner described above in the gamma ray detector 25 are supplied to the power and signal translating circuits 26 wherein the gamma ray detector pulses are amplified and standardized in amplitude and width and are then transmitted as pulses of the opposite polarity over the cable 12 to the surface equipment 11. At the surface, the gamma ray pulses are separated from the other signals present on the cable conductor 13 and are supplied to the gamma ray pulse detector circuit 19 wherein they are further amplified and standardized in amplitude and width and are then supplied to a separate input circuit of the recorder 22.

In the subsurface unit 10, the collar finder apparatus comprises the finder coils 23 and the collar finder circuit 24. The collar finder coils 23 are included in a bridge circuit which is balanced when the coils are located adjacent a ferrous metal casing or pipe of uniform wall thickness. As the coils move past a casing collar, however, one of the coils is influenced by the collar before the other coil, and there is thus produced a momentary unbalance of the impedances of the two coils. As a consequence, a unidirectional voltage deflection, or kick, is produced each time the unit 10 traverses a casing collar and these voltage kicks are supplied over the conductor 13 to the surface equipment 11. The unidirectional collar finder kicks are separated from the other signals present on the cable conductor 13 in the collar finder detector circuit 21 and are supplied to the recorder 22. There is thus produced simultaneously with the gamma ray and neutron logs on the record strip 22a a correlated collar position log so as to provide correlated depth measurement.

Subsurface unit 10

As discussed above in connection with the general system arrangement of Fig. 1, the subsurface unit 10, which is shown in detail in Figs. 2A and 2B of the drawings, performs the functions of supplying correlated neutron, gamma ray and collar position signals over the conductor 13 to the surface equipment 11 as the subsurface unit 10 is moved longitudinally of the borehole.

Referring now more particularly to Figs. 2A and 2B, the power and signal translating circuit 26 of the subsurface unit 10 comprises a power supply circuit 33, a gamma ray signal channel 31 and a neutron signal channel 32. The gamma ray signal channel 31 receives pulses from the gamma ray detector 25 in response to gamma rays intercepted by the detector 25. The neutron signal channel 32 is substantially identical to the gamma ray signal channel 31 and receives pulses from the neutron detector 27 in response to neutrons intercepted by the detector 27. The power supply circuit receives alternating current power from the generator 17 over the cable 12 and provides a unidirectional supply voltage which is suitable for energizing the vacuum tubes of the gamma ray signal channel 31 and the neutron signal channel 32. In Figs. 2A and 2B, corresponding elements in the channels 31 and 32 have been identified with the same reference numerals distinguished by the reference letter "g" for the gamma ray signal channel 31 and the reference letter "n" for the neutron signal channel 32.

Since the gamma ray channel 31 and the neutron signal channel 32 are substantially identical, only a detailed description of the gamma ray signal channel 31 will be included herein. However, it will be understood that the following description applies equally well to the neutron signal channel 32. In general, the gamma ray signal channel 31 comprises a univibrator 34g, a cathode follower 35g and an amplifier 36g. The univibrator 34g performs the functions of quenching the pulses developed by the gamma ray detector 25 and of amplifying the pulses and standardizing the amplitude and width thereof. It is in the form of a so-called one shot multivibrator and comprises two pentode type tubes 230g and 231g. The tube 230g is normally biased beyond anode current cut-off so as to provide a typical "one shot" type of operation wherein the multivibrator is normally quiescent and produces one output pulse for each gamma ray detector pulse supplied thereto. More particularly, the anode of the gamma ray detector 25 and the anode of the tube 230g are connected together and are supplied with anode potential from the power supply circuit 33 through the common load resistor 235g. Anode potential for the tube 231g is supplied by the circuit 33 through the resistors 236g, 237g and 238g. The control grid of the tube 231g is connected to the tube cathode through the resistor 239g and the cathodes of both of the tubes 230g and 231g are connected together and through the common resistor 240g to ground. The tube 231g is normally conductive, and the control grid of the tube 230g is connected to ground through the resistor 241g so that with the tube 231g conducting heavily, the cathode of the tube 230g is normally held sufficiently positive with respect to the control grid thereof to maintain the tube 230g non-conductive.

When a gamma ray strikes the detector 25 and causes the detector to discharge and draw anode current through the load resistor 235g, the voltage at the anode of the tube 230g decreases to produce a sharp negative pulse which is applied to the control grid of the tube 231g through the condenser 242g. This pulse serves to cut off current flow through the tube 231g. The resulting decrease in the voltage drop across the resistors 236g, 237g and 238g and rise in positive potential at the anode of the tube 231g causes current flow through the condenser 243g and resistor 241g which serves to decrease the bias on the control grid of the tube 230g so that this tube starts to conduct. Current conduction through the tube 230g serves to maintain the voltage drop across the anode resistor 235g. However, after the charge on the condenser 243g leaks off through the associated circuit components, the tube 231g again starts to conduct to lower the potential at its anode and hence increases the bias on the tube 230g until the latter is again rendered non-conductive. Thus, the univibrator 34g is restored to its normal condition.

As will be apparent from the above explanation, the gamma ray pulses produced at the anode of the gamma ray detector 25 merely serve to trigger the univibrator 34g so that a positive pulse is produced at the anode of the tube 231g each time this tube is rendered non-conductive in response to detection of a gamma ray by the detector 25. These univibrator pulses are of uniform amplitude and width and have a rate of occurrence equal to that of the gamma rays impinging upon the detector 25.

For the purposes of isolation, the positive pulses produced in the anode circuit of the tube 231a in the manner explained above are supplied to the cathode follower 35g. More specifically, the positive univibrator pulses are applied through the condenser 250g and the resistor 251g to the control grid of a cathode follower tube 252g and are repeated across the cathode load resistor 253g of the latter tube. The positive pulses thus produced across the cathode follower output resistor 253g are supplied to the amplifier 36g. This amplifier includes a double triode amplifier tube 260g, the cathodes of the two triode sections being connected through the common self biasing network 259g to ground. Output pulses from the cathode follower 35g are impressed directly upon the control grids of the two sections of the tube 260g and the anodes of the two tube sections are connected together and through the primary winding 261g of an output transformer 262g to the power supply circuit 33. The output transformer 262g is provided with a secondary winding 263g, one terminal of which is connected through the common coupling condenser 266 to ground and the other terminal of which is connected over the conductor 267 to the center conductor 13 of the cable 12. A common transient damping resistor 268 is connected across the secondary winding 263g of the output transformer 262g.

To summarize with respect to the operation of the gamma ray signal channel 31, it will be understood from the foregoing explanation that the pulses produced by the gamma ray detector 25 in response to gamma rays impinging upon this detector are standardized in amplitude and width by means of the univibrator 34g and are further amplified in the amplifier 36g so as to provide across the secondary winding 263g of the coupling transformer 262g sharp pulses of a given polarity, i. e. positive with respect to ground. These pulses are superimposed upon the 400 alternating current of the generator 17 and are transmitted over the cable 12 to the surface equipment 11. In an identical manner, the pulses produced by the neutron detector 22 in response to neutrons impinging upon the detector are standardized in amplitude and width in the univibrator 34n, and are amplified in the amplifier 36n. However, in order to distinguish the gamma ray pulses, which are produced across the output winding 263g and supplied over the conductor 267 to the cable 12 with a given polarity, from the neutron pulses produced across the secondary winding 263n of the neutron channel output transformer 262n, the winding 263n is connected across the common damping network including the resistor 268 and the condenser 266 with the opposite polarity so as to produce neutron pulses having a polarity opposite from the gamma ray pulses on the common conductor 267, i. e. pulses which are negative with respect to ground. The provision of a common line coupling condenser 266 and a common damping resistor 268 for both the gamma ray signal channel 31 and the neutron signal channel 32 serves the important function of substantially preventing ringing in the common output circuit for the channels 31 and 32. In this connection it will be understood that the resistor 268 is of very low value and preferably has a resistance of the order of 27 ohms, in order to prevent the inductive windings 263g and 263n, which are coupled together, from self-oscillating and producing disturbing ringing transients which would interfere with the oppositely polarized gamma ray and neutron pulses supplied to the common conductor 267.

In order to produce correlated indications of the depth to which the subsurface unit 10 is lowered, the collar finder circuit is provided. This circuit is arranged to be energized from the power supply circuit 33 and functions to supply unidirectional voltage deflections, or kicks, over the cable 12 to the collar finder detector circuit 21 at the surface. To supply operating current for the collar finder circuit 24, the ungrounded side of the winding 210 of the power transformer 203 is connected over the conductor 280 to the junction point between two resistors 281 and 282 having equal resistance values. These resistors form two arms of a bridge circuit, the other arms of which comprise identical collar finder coils 23a and 23b. The coils 23a and 23b are connected in series across the resistors 281 and 282 and the junction point between these coils is connected to ground to complete the low voltage alternating current circuit. An output voltage is taken from the above described bridge circuit by means of the coupling transformer 283, the primary winding 284 of which is connected between the opposite diagonal points of the bridge circuit. The outer ends of the transformer secondary winding 285 are connected to a full wave rectifier 286 and the winding 285 is provided with a grounded center tap 287 so as to produce a voltage across the filter condenser 290 which is negative with respect to ground. The rectified potential thus produced across the condenser 290 is smoothed in a filter circuit including the inductance coils 291 and 292 and the shunt condenser 293 so that a substantially unidirectional voltage is supplied over the conductor 267 to the cable conductor 13.

From the foregoing description, it will be evident that the resistors 281 and 282 and the collar finder coils 23a and 23b comprise a bridge circuit and if the impedances of the collar finder coils 23a and 23b are equal, the bridge is balanced and no voltage is produced across the primary winding 284 of the coupling transformer 283. The above-described situation obtains when the coils 23a and 23b are located adjacent a ferrous metal casing or pipe of uniform wall thickness. However, as the coils move past a casing collar, one of the coils 23a or 23b is influenced by the collar before the other coil, and there is thus produced a momentary unbalance of the impedances of the two coils. As a consequence, a voltage is produced across the primary winding 284 which is rectified by the rectifier 286 so as to provide a unidirectional voltage which is supplied over the cable 12 to the surface equipment 11. In this connection, it will be understood that the unidirectional voltage deflections, or kicks, which are produced by the collar finder circuit 24 are isolated from the alternating current power supply circuit by means of the condensers 201 and 18. It will also be understood that the collar finder voltage kicks are superimposed upon the other signals present on the cable conductor 13, so that the overall waveform of the voltage between the inner cable conductor 13 and the grounded outer sheath of the cable comprises a 400 cycle alternating current power wave which is used to energize the power supply circuit 33, gamma ray pulses of positive polarity which are superimposed upon the 400 cycle wave, neutron pulses of negative polarity which are also superimposed upon the 400 cycle wave and finally, the collar finder unidirectional voltage kicks or deflections which comprise a relatively slow increase and decrease of the unidirectional potential on the conductor 13.

Referring now more particularly to the details of the power supply circuit 33, alternating current from the surface generator 17 is transmitted through the condenser 18, the cable conductor 13 and the series connected choke coil 200, and condenser 201 to the primary winding 202 of a power transformer 203, the other end of the winding 202 being connected to ground so as to complete the circuit through the grounded sheath of the cable 12. A part of the alternating current supplied to the circuit 33 is delivered to the series-parallel connected cathode heaters 271 to 278, inclusive, of the various tubes in the subsurface unit 10 through a current limiting resistor 270. The power transformer 203 is provided with a first filament winding 204 which supplies filament power for a high voltage rectifier tube 205. The transformer 203 is also provided with a secondary winding 206, having a center tap 207 which is connected to ground, one side of the winding 206 being connected to the anode of the high voltage rectifier tube 205 and the other end of the winding 206 being connected to the anodes of a duo-diode power rectifier tube 208. The cathodes of the two sections of the tube 208 are connected together and through the filter condenser 209 to ground. The transformer 203 is also provided with a second filament winding 210 which supplies filament power to the vacuum tubes in the signal channels 31 and 32 and also supplies a low voltage alternating current to the collar finder circuit 24. The rectified high voltage output tube 205 is filtered in a two section R-C filter indicated generally at 215 and regulated by means of the series connected gaseous regulator tubes 216 and 217 to provide a rectified and filtered high voltage for exciting the gamma ray detector 25 and the neutron detector 27. Likewise, the rectified and filtered low voltage produced across the condenser 209 is utilized as an anode supply potential for the vacuum tubes of the signal channels 31 and 32.

In order that the power supply circuit 33 may be used as a common power supply for both the neutron and gamma ray signal channels and to prevent harmonics generated by the rectifiers 205 and 208 from being impressed upon the cable 12, the choke coil 200 is connected in series with the condenser 201 between the cable conductor 13 and the primary winding of the power transformer 203. This choke coil effectively prevents harmonics which may be generated by the rectifiers 205 and 208 from being coupled back through the power transformer 203 and impressed upon the cable 12 so that harmonics of the power supply frequency are not intermingled with the signals of the logging system.

A further feature of the power supply circuit 33 resides in the provision of a balanced type of operation whereby the output potential of the supply circuit does not vary appreciably with large changes in ambient temperature. In this connection, it will be understood that the subsurface unit 10 may be lowered into boreholes where the ambient temperature is exceedingly high. It is therefore necessary to provide a very stable power supply circuit which is substantially insensitive to temperature changes for the gamma ray and neutron signal channels so as to prevent interaction between these channels. In order to provide this balanced type of operation, the power transformer 203 is preferably so constructed that the two sections of the winding 206 have an equal number of direct current ampere turns. For example, the portion of the winding 206 which supplies power to the rectifier 208 is wound in phase opposition to the portion of the winding 206 which supplies power to the rectifier 205 and the current values of the two sections of the winding 206 are made inversely proportional to the potentials thereacross. With this arrangement, saturation of the transformer 203 is substantially eliminated and the stability and performance of the power supply 33 at high temperatures is substantially increased.

*Surface equipment 11*

Referring now more particularly to Figures 3A, 3B and 3C, the surface equipment 11 is there illustrated as comprising the gamma-ray pulse detector circuit 19, the neutron pulse detector circuit 20, the collar finder detector circuit 21, the recording instrument 22, an input filter circuit 37, and a power supply circuit 38. The filter circuit 37 is provided for the purpose of separating the gamma-ray pulses from the neutron pulses and supplying the separated pulses to the two detector circuits 19 and 20. The gamma-ray pulse detector circuit 19 is substantially identical with the neutron pulse detector circuit 20 and accordingly corresponding elements of the circuits 19 and 20 have been identified by the same reference numerals, distinguished by the reference letters "g" and "n," respectively. While only the gamma-ray pulse detector circuit 19 is described in detail hereinafter, it will be understood that this description applies equally well to the neutron pulse detector circuit 20.

As indicated above, the three different signals produced in the subsurface unit 10 are supplied over the cable 12 to the filter circuit 37. More specifically, the inner conductor 13 of the cable 12 is connected to a plural section high pass filter comprising the series-connected condensers 301, 302, 303 and 304 and the shunt connected resistors 305, 306, 307 and 308. The filter 37 further comprises an output filter section including the series connected condenser 310 and a shunt connected resistive branch, the value of which may be varied by means of the volume control switch 320. Thus, the movable arm 319 of the switch 320 may be selectively connected to the resistors 311 to 316, inclusive, so as to provide an adjustable time constant for the output section of the filter 37 while maintaining a substantially constant output impedance, as will be well understood by those skilled in the art. The primary winding 329 of a push-pull output transformer 330 is connected between the movable arm of the volume control switch 320 and ground. A pair of series connected resistors 332 and 333 are connected across the secondary winding 331 of the transformer 330, the junction point between the resistors 332 and 333 being connected to ground.

In order to prevent the 400 cycle power wave, which is supplied from the generator 17 over the cable 12 to the subsurface unit 10, from interfering with the detection of gamma-ray and neutron pulses, there is provided a pair of trap circuits which are respectively tuned to the fundamental and third harmonic frequencies of the 400 cycle power wave. More specifically, these trap circuits are connected across the first shunt resistor 305 of the filter circuit 37. The first trap circuit is in the form of a series resonant circuit tuned to 400 cycles and includes a condenser 335 and an inductance 336. Similarly, the second trap circuit is in the form of a series resonant circuit tuned to the third harmonic of the fundamental frequency and comprises the condenser 337 and the inductance 338. The series tuned circuits 335, 336 and 337, 338 present a very low impedance at the fundamental and third harmonic frequencies of the power wave so that these components are not transmitted through the remaining sections of the filter circuit 37.

Considering now the operation of the filter circuit 37 in separating the gamma ray and neutron pulses from the other voltages present on the cable conductor 13, it will be understood that the filter circuit 37 is required to pass the gamma ray and neutron pulses, which are inherently of a transient character and to prevent the transmission of the relatively low frequency 400 cycle power wave and the subsantial unidirectional collar finder voltage kicks. In order to perform these functions, it is necessary that the filter circuit 37 have a good transient characteristic and that the filter circuit not produce "ringing" or self-oscillation after each of the gamma ray and neutron pulses. If the filter 37 were comprised of a plurality of inductance capacitance filter sections, the filter would tend to "ring" and produce parasitic transient oscillations after each pulse, which would make it difficult to distinguish between the oppositely polarized gamma ray and neutron pulses. Accordingly, it is necessary that the filter circuit 37 produce a minimum amount of "ringing" immediately following the gamma ray and neutron pulses. Since the requirement that the filter circuit 37 produce a minimum of transient oscillations it is antithetic to the requirement of a sharp cut-off characteristic for the filter, the above-described trap circuits are provided to suppress the predominant components of the power frequency wave supplied by the generator 17.

From the foregoing explanation, it will be seen that the filter circuit 37 supplies gamma ray pulses of one polarity and neutron pulses of the opposite polarity to the series connected resistors 332 and 333. Specifically, the gamma ray pulses are of positive polarity when supplied to the primary winding of the transformer 330. These pulses appear as pulses which are positive with respect to ground across the resistor 332 and as pulses which are negative with respect to ground across the resistor 333. Likewise, the negative neutron pulses appear as pulses which are negative with repect to ground across the resistor 332 and as pulses which are positive with respect to ground across the resistor 333. It is thus evident that the gamma ray pulses may be separated from the neutron pulses by providing gamma ray and neutron circuits which are responsive only to potentials of different predetermined polarities with respect to ground.

The gamma ray pulse detector circuit 19 comprises an amplifier 39g, a univibrator 40g, a cathode follower 41g, a converter 42g and an integrating circuit 43g. The amplifier 39g includes an amplifier tube 340g, the control grid of which is connected to the ungrounded terminal of the resistor 332. The cathode of the tube 340g is operated at a potential which is positive with respect to ground by means of a voltage divider network including the resistor 341g, the potentiometer 342g and the resistor 343g. As will be understood, the potentiometer 342g may be adjusted to vary the cathode potential and hence the bias of the tube 340g. A by-pass condenser 344g is connected from the cathode of the tube 340g to ground. Anode potential is supplied from the +B supply source to the anode of the tube 340g through the resistors 345g and 346g.

It will be evident from the foregoing explanation that the control grid of the tube 340g is connected to ground potential through the resistor 332 whereas the cathode of the tube 340g is operated at a positive potential with respect to ground. The cathode potential may be adjusted by means of the potentiometer 342g so that the tube 340g is normally biased beyond anode current cut-off and the tube 340g will only respond to pulses of positive polarity across the resistor 332. In this connection it will be recalled that the gamma ray pulses appear across the resistor 332 as pulses which are positive with respect to ground. Accordingly, the positive gamma ray pulses are amplified in the tube 340g and appear as negative pulses across the series anode resistors 345g and 346g. It will also be recalled that the neutron pulses appear across the resistor 332 as pulses which are negative with respect to ground. Accordingly, the neutron pulses are not of the proper polarity to cause conduction of the tube 340g and are not passed by this tube.

The negative gamma ray pulses which are produced in the anode circuit of the tube 340g in the manner described above, are supplied through the coupling condenser 350g to the univibrator 40g. This univibrator 40g is essentially a one-shot multivibrator and comprises a pair of triode tubes 351g and 352g the anodes of which are cross-coupled to the control grids thereof through the coupling condensers 353g and 354g. The cathode of the tube 352g is connected directly to ground and the cathode of the tube 351g is biased to a predetermined positive potential through a voltage divider network which includes the resistors 355g and 356g. The control grid of the tube 351g is connected to ground through a resistor 357g so that the tube 351g is normally biased beyond cut-off by the positive bias impressed on the tube cathode from the above-described voltage divider circuit. On the other hand, the tube 352g normally conducts heavily due to the lack of bias between the cathode and control grid thereof. The univibrator 40g operates in exactly the same manner as the univibrator 34g described above. It will be understood, therefore, that each time an amplified gamma ray pulse of negative polarity, and representative of the detected gamma ray, is supplied to the control grid of the tube 352g from the tube 340g, the tube 352g is rendered conductive and the tube 351g is rendered non-conductive for an interval determined by the time constant of the grid circuit. As a consequence, negative pulses of uniform amplitude and width are produced in the anode circuit of the tube 351g at the rate of one such pulse for each pulse delivered to the univibrator 40g from the amplifier tube 340g.

In order to provide a low impedance output circuit for the univibrator 40g and to isolate the univibrator from the converter 42g, the cathode follower 41g is provided. Specifically, the negative univibrator pulses which are produced across the anode resistor 359g of the tube 351g are applied through the condenser 360g to the control grid of a cathode follower tube 361g and are reproduced with the same polarity across the cathode follower load circuit which comprises the series connected resistor 362g, potentiometer 363g, and resistor 364g. Univibrator pulses of adjustable but uniform amplitude and of negative polarity are thus reproduced at the arm of the potentiometer 363g and are supplied to the converter 42g.

The converter 42g performs the function of providing an output wave the amplitude of which varies in accordance with the rate of occurrence of the pulses developed by the univibrator 40g and hence of the intensity of the gamma rays intercepted by the gamma ray detector 25. To perform this function, the converter 42g utilizes the negative univibrator pulses produced at the arm of the potentiometer 363g to control the charging of a condenser circuit. More specifically, the negative univibrator pulses are supplied through a small condenser 370g to the cathode of a shunt rectifier 371g in the form of a diode which is paralleled by two series connected resistors 372g and 373g, the junction joint being connected through the resistor 374g to the power supply circuit 38.

In the converter 42g the condenser 370g is charged through the rectifier 371g during the negative portions of the univibrator pulses supplied from the cathode follower 41g and during these intervals the condenser 370g acquires a charge of the polarity shown in Fig. 3B. During on-pulse periods, the rectifier 371g is conductive and accordingly, the output terminal 375g of the converter 42g is clamped substantially to ground potential for the duration of the pulses from the univibrator 40g through the extremely low impedance of the conductive rectifier 371g. During each off-pulse interval the condenser 370g discharges through the series path including the resistors 372g, 373g, 364g, and the lower portion of the potentiometer 363g so that the voltage at the output terminal 375g decreases exponentially in accordance with the time constant of the condenser 370g and the resistance of its series discharge path. In this connection, it will be understood that during off-pulse intervals the rectifier 371g is non-conductive due to the fact that the cathode potential of this rectifier is raised above ground by virtue of the charge stored in the condenser 370g so that the shunting effect of the rectifier 371g is not present during the off-pulse intervals.

If the univibrator pulses, which coincide in time with the gamma ray detector pulses transmitted from the subsurface unit 10, are relatively far apart, the condenser 370g will discharge through the associated series path resistance so that the voltage at the output terminal 375g will fall to a minimum value before the next pulse. With this operation the average value of the pulse waveform, produced as described above at the output terminal 375g will have a minimum value. However, if the rate of occurrence of the univibrator pulses increases, the average value of the waveform produced at the output terminal 375g will increase in direct proportion to the frequency of occurrence of these pulses. Accordingly, the inverter circuit 42g provides an output voltage the average value of which is proportional to the rate of occurrence of the univibrator pulses supplied thereto. In this connection, it is noted that the size of the condenser 370g is of considerable importance in that the condenser should not be so large as not to discharge at all during the shortest off-pulse interval. Thus, if the condenser 370g does not discharge appreciably during the shortest off-pulse interval, the voltage thereacross is built up to a relatively high steady state value with the result that the average value of the voltage at the output terminal 375g remains at a maximum positive value and does not vary with the frequency of occurrence of the gamma ray pulses. Accordingly, a given condenser 370g has an upper frequency limit above which the converter 42g will not provide an output voltage the amplitude of which varies in accordance with the frequency of the gamma ray pulses.

In order to increase the frequency range of the converter 42g so that this circuit will respond to gamma ray pulses having widely different rates of occurrence, a second charging condenser 376g is provided which may be substituted for the condenser 370g by means of the selector switch 377g. It will be understood that the condenser 376g has a capacity substantially different from the capacity of the condenser 370g so that the time constant of the series circuit is substantially different when the condensers 370g and 376g are respectively included therein. It will also be understood that the average value of the output wave at the terminal 375g increases in a positive sense as the frequency of occurrence of the univibrator pulses increases due to the fact that the rectifier 371g clamps the negative portions of the univibrator pulses to ground during the conductive periods thereof.

While the output wave from the converter 42g has an average value which varies in accordance with the frequency of occurrence of the univibrator pulses, it also includes the relatively high frequency components of the univibrator pulses themselves, which components are unsuitable for application to the indicating and recording apparatus. Accordingly, an adjustable integrating circuit 43g is provided which integrates the output of the converter 42g so as to provide a substantially unidirectional voltage, the amplitude of which is proportional to the frequency of occurrence of the gamma ray pulses supplied to the surface equipment 11. More specifically, the circuit 43g comprises a first filter section including a series resistor 378g and a shunt condenser 379g and a variable second filter section indicated generally at 380g. The second filter section 380g comprises the series resistors 381g which are of different values and may be selectively combined with the shunt condensers 382g by means of the step selector switch 383g to provide various degrees of smoothing in the second filter section. The movable arm of the selector switch 383g is connected through the limiting resistor 384g to the control grid of a cathode follower type metering tube 385g. The smoothing action of the integrating circuit 43g may be varied by means of the step selector switch 383g so that the output wave from the converter 42g may be filtered to remove the high frequency components thereof without excessively reducing the overall amplitude of this output wave. Thus the step switch 383g may be employed to select the optimum value for the second filter section to provide adequate smoothing out of the high frequency components while reducing the average value of the output wave by a minimum amount.

The metering tube 385g is provided for the purpose of indicating the average value of the output wave from the converter 42g and of providing a low impedance output circuit for the recorder 22. The anode of the metering tube 385g is connected to the power supply circuit 38 and is also connected through a series circuit including the potentiometer 386g and the resistors 387g and 388g to ground. The cathode of the metering tube 385g is connected through the frequency meter 389g to the junction point between the potentiometer 386g and the resistor 387g. With this circuit arrangement, the metering tube 385g acts as an amplifier which provides essentially no voltage amplification but substantial current amplification. Accordingly the output of the metering tube 385g is of extremely low impedance and is suitable for energizing the frequency meter 389g and for impressing the variable unidirectional voltage derived from the integrating circuit 43g upon the low impedance input circuit of the recorder 22.

The cathode of the metering tube 385g is operated at a potential which is positive with respect to ground by an amount equal to the voltage drop through the series resistors 387g and 388g. The control grid of the tube 385g is conductively connected through the resistors 384g, 381g, 378g and 372g to the junction point between the resistors 373g and 374g. Accordingly, the control grid of the tube 385g is biased positive with respect to ground by an amount equal to the voltage drop across the resistor 373g. The voltage drop across the resistor 373g is preferably relatively small, i. e., in the order of two volts and the potential of the cathode of the metering tube 385g may be varied by adjusting the potentiometer 386g so that the tube 385g draws minimum current in the absence of pulses from the univibrator 40g.

To summarize, it will be apparent that when the univibrator 40g is triggered in accordance with gamma ray pulses transmitted from the subsurface unit 11, the integrating circuit 43g provides an output wave the average value of which is equal to the frequency of occurrence of the univibrator pulses, which wave is supplied to the control grid of the metering tube 385g. If the gamma ray pulses are relatively far apart, a relatively small positive potential is applied to the control grid of the tube 385g and the meter 389g registers a correspondingly small deflection. On the other hand, if the gamma ray pulses are relatively close together, the average value of the frequency meter output wave increases positively, thus causing a corresponding increase in the deflection of the meter 389g. Corresponding variations in the amplitude of the wave trace produced by the recorder 22 are produced in an obvious manner.

As discussed above, the neutron pulse detector circuit 20 is substantially identical to the gamma ray pulse detector circuit 19, and accordingly the detailed description given above applies equally well to the neutron pulse detector circuit 20. However, it will be understood that the amplifier 39n accepts neutron pulses and rejects gamma ray pulses in the same manner as the amplifier 39g accepts gamma ray pulses and rejects neutron pulses. It will be recalled that the output transformer 330 inverts the neutron pulses supplied thereto so that the neutron pulses appear as pulses which are positive with respect to ground across the resistor 333. Also, the transformer 330 inverts the gamma ray pulses so that they appear as pulses which are negative with respect to ground across the resistor 333. The cathode potential of the tube 340n may be adjusted by means of the potentiometer 342n so that the tube 340n is normally operated beyond the anode current cutoff point. Accordingly, the negative gamma ray pulses produced across the resistor 333 are not passed by the tube 340n, but the neutron pulses which appear as positive pulses across the resistor 333 are transmitted through and amplified in the tube 340n.

In other respects the neutron pulse detector circuit 20 is substantially identical with the gamma ray pulse detector circuit 19. However, it should be noted that the neutron pulses may have substantially higher rates of occurrence than the gamma ray pulses. It is thus necessary to provide sufficiently small condensers 370n and 376n in the converter 42n to function satisfactorily at the higher pulse rates. Also, the metering tube 385n is paralleled by a similar tube 390n so that the meter circuit will respond satisfactorily at the higher pulse rates experienced in the neutron channel. It will be understood that the output wave from the neutron pulse detector circuit 20 is produced across the resistor 388n and is supplied to the recorder 22 so as to provide variations in the amplitude of a second wave trace produced by the recorder 22 in an obvious manner.

The power supply circuit 38 is of the conventional full wave rectifier type and is supplied with alternating current from any suitable alternating current source through the on-off power switch 391. The output voltage from the full wave rectifier 392 is filtered in the pi-section filter 393 and supplied through the potentiometer 394 to the series connected gaseous rectifier tubes 395 and 396. There is thus produced on the +B conductor 397 a regulated unidirectional voltage which is suitable for energizing the vacuum tubes of the various components of the surface equipment 11.

The collar position signals supplied by the subsurface equipment 10 to the cable 12 are transmitted over the conductor 13 to the collar finder detector circuit 21. The collar finder detector circuit comprises a plural section low pass inductance-capacitance filter 397 which functions to pass the unidirectional voltage deflections produced by the collar finder circuit 24 when the subsurface unit 10 traverses a collar and rejects the 400 cycle power wave and the high frequency gamma ray and neutron pulses. The output signal delivered by the low pass filter circuit 397 is connected to a collar finder meter 398 which is connected in series with the resistor 399 across the output condenser of the filter 397. The meter 398 produces a visual indication of the casing collars traversed by the collar finder coils 23a and 23b of the subsurface unit 10. The unidirectional voltage deflections produced across the resistor 399 are supplied to a separate input circuit of the recorder 22 so as to produce correlated collar position information simultaneously with the production of correlated gamma ray and neutron logs.

Referring now more particularly to Figs. 4A and 4B of the drawings, an alternative embodiment of the surface equipment is there illustrated which is particularly adapted for use in the simultaneous well logging system of Fig. 1. In Figs. 4A and 4B only a single detector channel is shown, namely, the gamma ray pulse detector circuit 19, and the common filter circuit 37 is omitted. However, it will be understood that an identical neutron pulse detecting circuit 20 may be employed in the manner described in detail in connection with Figs. 3A, 3B and 3C to provide the simultaneous logs described above. In the alternative embodiment of the surface equipment shown in Figs. 4A and 4B, elements which are the same as corresponding elements in Figs. 3A, 3B and 3C have been given the same reference numerals.

In the arrangement illustrated in Figs. 4A and 4B, the gamma ray pulses which are passed by the transformer 330 are repeated as positive pulses across the resistor 332 and supplied through the condenser 400g to the control grid of the first amplifier tube 401g. The cathode of the tube 401g is connected through the resistors 402g and 403g to ground. Gamma ray pulses which are impressed upon the control grid of the tube 401g are amplified by this tube and appear as negative pulses across the anode load resistor 404g. The negative pulses produced at the anode of the tube 401g are directly connected over the conductor 405g to the control grid of a cathode follower tube 406g and are reproduced with the same polarity across the cathode resistor 407g thereof.

In order to stabilize the amplitude of the gamma ray pulses and to the end that interaction between the gamma ray and neutron channels is substantially prevented, an automatic gain control circuit is provided which includes the cathode follower tube 410g, the rectifier tube 411g and the shunt control tube 412g. The control grid of the cathode follower tube is directly connected to the conductor 405g so that the negative gamma ray pulses produced in the anode circuit of the tube 401g are supplied to the control grid of the cathode follower tube 410g and are reproduced with the same polarity across the cathode resistor 415g thereof. The negative pulses as reproduced across the cathode resistor 415g are applied through the condenser 416g to the cathode of the rectifier tube 411g. The cathode of the tube 411g is also connected to ground through the resistors 417g and 418g; and the junction point between the resistors 417g and 418g is connected through the resistor 419g to the +B conductor. The anode of the rectifier tube 411g is connected to ground through a rectifier load resistor 420g which is paralleled by a filter condenser 421g so that there is produced across the rectifier load circuit 420g and 421g a unidirectional voltage which is negative with respect to ground and has an amplitude proportional to the amplitude of the gamma ray pulses.

The negative control voltage thus produced across the rectifier load resistor 420g is supplied to the control grid of the shunt control tube 412g. This tube is provided with an anode which is connected to the cathode of the tube 401g and the cathode of the tube 412g is connected through the potentiometer 422g to ground. Thus, the tube 412g is effectively connected across the cathode resistors 402g and 403g of the tube 401g so that the anode-cathode space path resistance of the control tube 412g produces a variable shunting effect on the resistors 402g and 403g. A switch 423g is also provided which is controlled by movement of the control arm of the potentiometer 422g and is opened so as to introduce the tube 412g when the potentiometer is in its minimum resistance position.

Considering now the operation of the above-described automatic gain control circuit in maintaining the amplitude of the gamma ray pulses substantially constant, it will be apparent from the foregoing explanation that the gamma ray pulses produced across the resistor 332 are amplified and inverted in the tube 401g and are repeated as negative pulses across the cathode resistor 415g of the cathode follower tube 410g. These negative pulses are peak rectified in the rectifier circuit including the rectifier tube 411g and the load circuit 420g and 421g so as to provide a unidirectional control voltage which is negative with respect to ground. The negative control voltage is applied to the control grid of the control tube 412g so as to vary conduction therethrough and hence the anode-cathode space path resistance thereof. As the amplitude of the gamma ray pulses increases the negative control voltage increases correspondingly and operates to reduce current conduction through the tube 412g so that the shunting effect of the tube 412g is decreased. When the shunting effect of the tube 412g is decreased, the effective resistance of the cathode circuit of the tube 401g is increased, and, due to the fact that this circuit is degenerative, a negative feed back action takes place which reduces the amplification in the tube 401g so that the amplitude of the gamma ray pulses is decreased. The automatic gain control circuit thus operates to control the amplitude of the gamma ray pulses inversely with changes in the signal level of these pulses.

The standardized gamma ray pulses which are produced in the manner described above across the resistor 407g are supplied to the univibrator 40g which latter unit functions in a manner entirely identical with that described in connection with Figs. 3A, 3B and 3C to provide univibrator pulses of uniform amplitude and width coincident with each of the gamma ray pulses. The univibrator pulses are applied through the condenser 360g to the control grid of a second amplifier tube 430g. This tube is provided for the purpose of amplifying the univibrator pulses before they are supplied to the converter 42g. The negative univibrator pulses are amplified and inverted in the tube 430g and appear as positive pulses across the second load resistor 431g thereof. The amplified univibrator pulses thus produced at the anode of the tube 430g are applied through condenser 432g to the control grid of a cathode follower tube 433g and are reproduced with the same polarity across the series connected cathode resistors 434g and 435g.

Due to the fact that the univibrator pulses are inverted in polarity in the tube 434g, that is, the univibrator pulses appear as positive pulses across the cathode resistors 434g and 435g, it is necessary to reverse the polarity of the converter 42g. Thus, the positive univibrator pulses produced in the cathode circuit of the tube 434g are coupled through the potentiometer 436g and the charging condenser 437g to the anode of the shunt rectifier 438g. A resistor 439g is connected from the anode of the tube 438g to ground and the cathode of the tube 438g is connected through the resistors 440g and 441g to ground, the junction point between the resistors 440g and 441g being connected through the resistor 442g to the +B conductor. The charging condenser 437g is charged through the rectifier 438g, which conducts during the on-pulse intervals of the positive univibrator pulses so that the condenser 437g is charged through the rectifier 438g and acquires a charge of the polarity shown in Fig. 4B. During off-pulse intervals the condenser 437g discharges through the series path which includes the resistors 439g, 435g, 434g and the potentiometer 436g, and there is produced at the output terminal 375g an output wave the average value of which is proportional to the frequency of occurrence of the univibrator pulses.

In order to provide a smoothing circuit for the output wave of the converter 42g, whereby maximum output is derived for a given gamma ray detector response, a multi-mesh resistance capacitance low pass filter indicated generally at 450g is provided. More specifically, the output wave from the converter 42g is applied to the first filter section which includes the shunt condenser 451g and one of the series connected resistors 452g. The desired filter resistor may be selected by means of one movable contact on a step selector switch 453g. The output wave is then applied through the series resistor 454g to the second section which includes the shunt condenser 455g and one of the resistors 456g which may be selected by a second movable contact on the step selector switch 453g. The output wave is then applied through the series resistor 457g to a third filter section which includes a shunt connected condenser 458g and one of the series resistors 459g which may be selected by a third movable contact on the step switch 453g. The output wave then passes through the series resistor 460g to the control grid of the metering tube 385g, there being a fourth shunt condenser 461g connected between the control grid of the tube 385g to ground.

Considering now the operation of the multi-mesh low pass filter 452, it will be seen from the foregoing explanation that the output wave from the converter 42g must be smoothed out to provide a control voltage having an amplitude the average value of which varies in accordance with the rate of occurrence of the gamma ray pulses. However, it is necessary to reduce the extraneous noise voltages which may be present in the output wave of the converter 42g in order to maximize the response and provide a usable control voltage for the metering tube 385g. With the multi-mesh low pass filter 450g the effect of statistical fluctuations appears to be substantially reduced for an output wave of a given amplitude, so that the sensitivity and output of the converter 42g is effectively increased. Accordingly, it is preferable to employ the multi-mesh R-C filter circuit, described above, instead of a conventional time constant circuit for the reason that a greater percentage of the signal is available as a usable output wave.

In order to vary the sensitivity of the recorder 22 and to provide maximum output for the recorder from the metering tube 385g, the compensation circuit 470 is provided. This circuit comprises a recitifer network 470a which is operated from a suitable alternating current supply and provides a regulated negative voltage of the polarity shown across the series connected resistors 471 and 472. A potentiometer 473 is connected across the series resistors 471 and 472 and the arm of the potentiometer 473 is connected through the resistor 474 to the movable contact of a selector switch 475. The junction point between the resistors 471 and 472 is connected over the conductor 476 to one input terminal 477 of the recorder 22. The fixed contact of the selector switch 475 is connected over the conductor 478 to one side of the meter 389g and to the bottom end of a potentiometer 480 which is connected between the cathode of the tube 385g and the meter 389g. The arm of the potentiometer 480 is connected to the other terminal 481 of the recorder 22. A resistor 482 is connected between the conductors 476 and 478. It will be understood that the terminals 477 and 481 comprise one input circuit of the recorder 22 and that another identical input circuit is employed for the neutron pulse detector circuit.

Considering now the operation of the compensation circuit 470, it will be understood that the voltage across the resistor 482 may be varied from a relatively large negative voltage to a positive voltage by varying the position of the arm of the potentiometer 473. Preferably the resistor 471 has a value approximately ten times the value of the resistor 472, and when the arm of the potentiometer is in its uppermost position, a relatively large negative voltage is produced across the resistor 482. It will be recalled that the metering tube draws more current as the pulse rate increases so that the voltage across the potentiometer 480 increases positively as the pulse rate increases. It is thus seen that the voltage across the resistor 482, when the arm of the potentiometer 473 is in its uppermost position, is in opposition to the voltage across the potentiometer 480 and operates to reduce the net voltage applied to the terminals of the recorder 477 and 481. If the arm of the potentiometer 473 is moved downwardly, the negative voltage across the resistor 482 decreases so as to increase the net voltage supplied to the recorder 22. If the arm of the potentiometer 473 is in its lowest position, a positive voltage of smaller magnitude is produced across the resistor 482 which is added to the output voltage across the potentiometer 480. In this connection it will be understood that the voltage between the conductor 476 and the arm of the potentiometer 473 is reduced in the ratio of the resistors 474 and 482 so that a relatively small voltage is inserted in series with the recorder input terminals. The value of the resistor 474 may be different for the gamma ray and neutron detector circuits. The arm of the potentiometer 480 may be adjusted to impress a portion of the output voltage produced across the potentiometer 480 on the recorder and thereby vary the sensitivity of the recorder 22. The selector switch 475 may be mechanically connected to the arm of the potentiometer 473 so that when this potentiometer is in its extreme position the switch 475 is opened, and the resistor 482 then becomes merely a voltage dividing resistor and reduces the voltage applied to the input terminals of the recorder from the potentiometer 480.

It will be noted that the present invention is concerned with the simultaneous measurement of natural gamma rays and artificially induced radiant energy. It should, therefore, be understood that as used in this specification the phrase "penetrative radiation" is intended to include all forms of natural, secondary or artifically produced or induced radiant energy or radioactivity such, for example, as gamma rays, neutrons and the like.

While particular embodiments of the invention have been shown, it will be understood, of course, that the invention is not limited thereto since many modifications may be made, and it is therefore contemplated by the appended claims to cover any such modifications as fall within the true spirit and scope of the invention.

What is claimed as new and desired to be secured by Letters Patent of the United States is:

1. A simultaneous neutron and gamma ray well logging system, comprising a subsurface unit, a single conductor cable for lowering said unit into a borehole, a source of neutrons included in said unit for irradiating with neutrons the subsurface strata traversed by the borehole, neutron detector means included in said unit and operative to produce signals in response to neutrons returning so said neutron detector means from the strata traversed by said unit, gamma ray detector means included in said unit and operative to produce signals in response to gamma rays intercepted thereby, means including the single conductor of said cable for supplying alternating current power to said unit, a common power supply circuit included in said unit for rectifying said alternating current to provide a substantially unidirectional operating potential for said detector means, a choke coil connected in series with said common power supply circuit, means connecting the series combination of said choke coil and said power supply circuit between the single conductor and sheath of said cable for preventing rectifier transients produced in said common power supply circuit from being impressed upon the single conductor of said cable, means for transmitting signals from said detector means over the single conductor of said cable to the earth's surface, means at the earth's surface for separating the signals from said two detector means and for producing a continuous graph of correlated neutron and gamma ray activity in accordance with said separated signals.

2. In a penetrative radiation logging system, the combination of, a radiation detector arranged to be moved longitudinally of a borehole, means for transmitting to the earth's surface pulses of relatively short duration in response to radiations intercepted by said detector, a rectifying device having a load circuit connected thereto, means responsive to said pulses for supplying corresponding pulses to said rectifying device, and means including said load circuit for deriving from said rectifying device an output wave having an amplitude proportional to the rate of occurrence of said pulses, said last named means including a multi-mesh low pass filter for removing the high frequency components of said pulses, said filter having a plurality of sections connected in cascade, each of said sections including one resistive element and one reactive element.

3. A simultaneous neutron and gamma ray well logging system, comprising a subsurface unit, a single conductor cable for lowering said unit into a borehole, a source of neutrons included in said unit for bombarding with neutrons the subsurface strata traversed by said unit, neutron detector means included in said unit and operative to produce signals in response to neutrons returning to said neutron detector means from the strata traversed by said unit, gamma ray detector means included in said unit and operative to produce signals in response to gamma rays intercepted thereby, means including the single conductor of said cable for supplying alternating current power to said unit, a common power supply circuit included in said unit for rectifying said alternating current to provide a substantially unidirectional operating potential for said detector means, means included in said power supply circuit for maintaining said operating potential substantially constant despite changes in ambient temperature thereof, said last named means including a power transformer provided with a secondary winding having a first section for producing a relatively high operating potential and a second section for producing a relatively low operating potential, said winding sections being wound in opposition and the direct current ampere turns of the two sections being substantially equal to minimize saturation effects thereof, means for transmitting signals from said detector means over the single conductor of said cable to the earth's surface, and means at the earth's surface for separating the signals from said two detector means and for producing a continuous graph of correlated neutron and gamma ray activity in accordance with said separated signals.

4. A simultaneous neutron and gamma ray well logging system, comprising a subsurface unit, a single conductor cable for lowering said unit into a borehole, a source of neutrons included in said unit for radiating neutrons to the subsurface material traversed by the borehole, neutron detector means included in said unit and operative to produce signals in response to neutrons returning to said neutron detector means from the material traversed by the borehole, gamma ray detector means included in said unit and operative to produce signals in response to gamma rays intercepted thereby, means including the single conductor of said cable for supplying alternating current power to said unit, a common power supply circuit included in said unit for rectifying said alternating current to provide a substantially unidirectional operating potential for said detector means, means included in said power supply circuit for maintaining said operating potential substantially constant despite changes in ambient temperature thereof, said last-named means including a power transformer provided with a secondary winding having a first section for producing a relatively high operating potential and a second section for producing a relatively low operating potential, said winding sections being wound in opposition and the direct current ampere turns of the two sections being substantially equal to minimize saturation effects thereof, means for preventing rectifier transients produced in said common power supply circuit from being impressed upon the single conductor of said cable, means for transmitting signals from said detector means over the single conductor of said cable to the earth's surface, and means at the earth's surface for separating the signals from said two detector means and for producing a continuous graph of correlated neutron and gamma ray activity in accordance with said separated signals.

5. A simultaneous neutron and gamma ray well logging system, comprising a subsurface unit, a single conductor cable for lowering said unit into a borehole, a source of neutrons included in said unit for radiating neutrons to the subsurface material traversed by the borehole, a neutron signal channel included in said unit and including a neutron detector for producing pulses in response to neutrons returning to said neutron detector from the material traversed by said borehole, a gamma ray signal channel included in said unit and including a gamma ray detector for producing pulses in response to gamma rays intercepted thereby, coupling means included in said neutron signal channel for impressing neutron pulses of a given polarity on the single conductor of said cable to transmit the same to the earth's surface, coupling means included in said gamma ray signal channel for impressing gamma ray pulses of the opposite polarity on the single conductor of said cable to transmit the same to the earth's surface, damping means common to both said coupling means for preventing self-oscillation thereof, pulse polarity responsive means at the earth's surface for separating said gamma ray pulses from said neutron pulses, and means responsive to the separated gamma ray and neutron pulses for simultaneously producing a continuous correlated graph of gamma ray and neutron activity.

6. A simultaneous neutron and gamma ray well logging system, comprising a subsurface unit, a single conductor cable for lowering said unit into a borehole, a source of neutrons included in said unit for radiating neutrons to the subsurface material traversed by the borehole, a neutron signal channel included in said unit and including a neutron detector for producing pulses in response to neutrons returning to said neutron detector from the material traversed by said borehole, a gamma ray signal channel included in said unit and including a gamma ray detector for producing pulses in response to gamma rays intercepted thereby, a first coupling transformer included in said neutron signal channel for impressing neutron pulses of a given polarity on the single conductor of said cable to transmit the same to the earth's surface, a second coupling transformer included in said gamma ray signal channel for impressing gamma ray pulses of the opposite polarity on the single conductor of said cable to transmit the same to the earth's surface, a damping resistor connected in parallel across the secondary windings of both said coupling transformers for suppressing ringing transients to prevent the same from being impressed on the single conductor of said cable, means at the earth's surface for separating said gamma ray pulses from said neutron pulses, and means responsive to the separated gamma ray and neutron pulses for simultaneously producing a continuous correlated graph of gamma ray and neutron activity.

7. A simultaneous neutron and gamma ray well logging system, comprising a subsurface unit, a single conductor cable for lowering said unit into a borehole, a source of neutrons included in said unit for irradiating with neutrons the subsurface formations traversed by said unit, neutron detector means included in said unit and operative to produce pulses of a given polarity in response to neutrons returning to said neutron detector means from the formations traversed by said unit, gamma ray detector means included in said unit and operative to produce pulses of the opposite polarity in response to gamma rays intercepted thereby, means including the single conductor of said cable for supplying alternating current power to said unit, means for transmitting pulses from both said detector means over the single conductor of said cable to the earth's surface, means at the earth's surface and including high pass filter means for separating said pulses from the alternating current wave impressed on the single conductor of said cable, said filter means having a plurality of sections connected in cascade, each of these sections having only one reactive element and a resistive element, whereby said filter means passes pulses from said detector means without the production of substantial ringing transients, means for separating the pulses of different polarities passed by said filter, and means responsive to said separated pulses for simultaneously producing a continuous graph of neutron and gamma ray intensity.

8. A simultaneous neutron and gamma ray well logging system, comprising a subsurface unit, a single conductor cable for lowering said unit into a borehole, a source of neutrons included in said unit for emitting neutrons to the subsurface formations traversed by said unit, neutron detector means included in said unit and operative to produce pulses of a given polarity in response to neutrons returning to said neutron detector means from the formations traversed by said unit, gamma ray detector means included in said unit and operative to produce pulses of the opposite polarity in response to gamma rays intercepted thereby, means including the single conductor of said cable for supplying alternating current power to said unit, means for transmitting pulses from both said detector means over the single conductor of said cable to the earth's surface, means at the earth's surface and including high pass filter means for separating said pulses from the alternating current wave impressed on the single conductor of said cable, said filter means passing pulses from said detector means without the production of substantial ringing transients and including a trap circuit tuned to the fundamental frequency of said alternating current wave, means for separating the pulses of different polarities passed by said filter, and means responsive to said separated pulses for simultaneously producing a continuous graph of neutron and gamma ray intensity.

9. A simultaneous neutron and gamma ray well logging system, comprising a subsurface unit, a single conductor cable for lowering said unit into a borehole, a source of neutrons included in said unit for radiating neutrons to the subsurface material traversed by the borehole, neutron detector means included in said unit and operative to produce pulses of a given polarity in response to neutrons returning to said neutron detector means from the material traversed by the borehole, gamma ray detector means included in said unit and operative to produce pulses of the opposite polarity in response to gamma rays intercepted thereby, means for transmitting pulses from both said detector means over the single conductor of said cable to the earth's surface, surface equipment including a transformer provided with a primary winding and a secondary winding having a grounded center tap, means for supplying pulses of both polarities from the single conductor of said cable to the primary winding of said transformer, a neutron detector channel for selecting pulses of said given polarity and including an electron discharge tube biased to accept only pulses of said given polarity and connected to one end of said secondary winding, a gamma ray detector channel for selecting said pulses of opposite polarity and including an electron discharge tube biased to accept only pulses of said opposite polarity and connected to the other end of said secondary winding, and means responsive to the pulses transmitted through said channels for simultaneously producing a continuous graph of neutron and gamma ray activity.

10. A simultaneous neutron and gamma ray well logging system, comprising a subsurface unit, a single conductor cable for lowering said unit into a borehole, a source of neutrons included in said unit for emitting neutrons to the subsurface strata traversed by said unit, neutron detector means included in said unit and operative to produce pulses of a given polarity in response to neutrons returning to said neutron detector means from the strata traversed by said unit, gamma ray detector means included in said unit and operative to produce pulses of the opposite polarity in response to gamma rays intercepted thereby, means for transmitting pulses from both said detector means over the single conductor of said cable to the earth's surface, surface equipment comprising a neutron detector channel for selecting pulses of said given polarity and including means responsive to the pulses traversing said channel for producing a voltage having an amplitude proportional to the rate of occurrence of the pulses in said channel, and a gamma ray detector channel for selecting pulses of said opposite polarity and including means response to the pulses traversing said last-named channel for producing a voltage having an amplitude proportional to the rate of occurrence of the pulses in said last-named channel, automatic gain control means included in at least one of said channels for preventing cross feed of pulses between said channels, and means for recording both of said voltages to provide correlated logs of the neutron and gamma ray activity in the borehole.

11. A simultaneous neutron and gamma ray well logging system, comprising a subsurface unit, a single conductor cable for lowering said unit into a borehole, a source of neutrons included in said unit for bombarding with neutrons the subsurface strata traversed by said unit, neutron detector means included in said unit and operative to produce pulses of a given polarity in response to neutrons returning to said neutron detector means from the strata traversed by said unit, gamma ray detector means included in said unit and operative to produce pulses of the opposite polarity in response to gamma rays intercepted thereby, means for transmitting pulses from both said detector means over the single conductor of said cable to the earth's surface, surface equipment comprising a neutron detector channel for selecting pulses of said given polarity and including means responsive to the pulses traversing said channel for producing a voltage having an amplitude proportional to the rate of occurrence of the pulses in said channel, and a gamma ray detector channel for selecting pulses of said opposite polarity and including means responsive to the pulses traversing said last-named channel for producing a voltage having an amplitude proportional to the rate of occurrence of the pulses in said last-named channel, automatic gain control means included in each of said channels for standardizing the amplitude of said pulses, thereby to prevent interaction between said channels, and means for recording both of said voltages to provide correlated logs of the neutron and gamma ray activity in the borehole.

12. In a penetrative radiation well logging system, means for substantially equalizing the amplitude of radiation pulses transmitted to the earth's surface, comprising an amplifier tube, means for supplying said pulses to the control grid of said amplifier tube, a resistor connected between the cathode of said amplifier tube and ground, a variable impedance device connected across said resistor, and means for changing the impedance of said device in accordance with changes in the amplitude of said pulses, said last-named means including a cathode follower tube energized from the anode of said amplifier tube and a peak rectifier circuit for rectifying the output of said cathode follower tube to provide a unidirectional control voltage suitable for controlling said variable impedance device.

13. In a penetrative radiation well logging system, means for substantially equalizing the amplitude of radiation pulses transmitted to the earth's surface, comprising an amplifier tube, means for supplying said pulses to the control grid of said amplifier tube, a resistor connected between the cathode of said amplifier tube and ground, a control tube connected across said resistor, a cathode follower tube energized from the anode of said amplifier tube, a peak rectifier circuit for deriving from the output of said cathode follower tube a unidirectional control voltage proportional to the amplitude of said pulses, and means for varying the anode-cathode space path of said control tube in accordance with said control voltage, thereby to vary the gain of said amplifier tube inversely with changes in the amplitude of said pulses.

14. A simultaneous penetrative radiation well logging and collar locating system, comprising a subsurface unit, a single conductor cable for lowering said unit into a cased borehole, a source of neutrons included in said unit for bombarding with neutrons the formations traversed by said unit, first detector means included in said unit and operative to produce signals in response to radiations incoming thereto due to said neutron bombardment, second detector means included in said unit and operative to produce signals in response to gamma rays naturally emanating from the formations traversed by said borehole, means including the single conductor of said cable for supplying alternating current power to said unit, collar locating means in said unit and including a bridge circuit provided with impedance means which changes in accordance with changes in the effective thickness of the borehole casing adjacent said unit, means for developing a collar locating voltage proportional to the balance condition of said bridge circuit, means for continuously supplying alternating current to said bridge circuit to energize the same so that the balance condition of said bridge circuit is continuously controlled in accordance with the impedance of said impedance means, whereby said collar locating means detects the presence of a casing collar adjacent said unit when said unit is stationary, means for impressing the signals from both said detector means on the single conductor of said cable, means for impressing said collar locating voltage on the single conductor of said cable without masking the detector signals impressed thereon, means at the earth's surface coupled to the single conductor of said cable for separating said detector signals and said collar locating voltage each from the other, and means for recording said separated signals and collar locating voltage on a common record medium to provide continuous correlated indications of the magnitudes thereof.

15. A simultaneous penetrative radiation well logging and collar locating system, comprising a subsurface unit, a single conductor cable for lowering said unit into a cased borehole and including a single conductor and a sheath, a source of neutrons included in said unit for bombarding with neutrons the formations traversed by said unit, first detector means included in said unit and operative to produce signals in response to radiations incoming thereto due to said neutron bombardment, second detector means included in said unit and operative to produce signals in response to gamma rays naturally emanating from the formations traversed by said borehole, collar locating means in said unit for producing a collar locating voltage related to changes in the effective thickness of the borehole casing adjacent said unit, means at the earth's surface for supplying alternating current power to said cable while maintaining a high impedance between the conductor and sheath of said cable for said detector signals and said collar finder voltage, means for impressing signals from both said detector means on said cable while maintaining a high impedance between the conductor and sheath of said cable for said collar locating voltage and said alternating current power, means for impressing said collar locating voltage on the cable while maintaining a high impedance between the single conductor and sheath of said cable for said alternating current power and said detector signals, means at the earth's surface coupled to the single conductor of said cable for separating said detector signals and said collar locating voltage each from the other, and means for recording said separated signals and collar locating voltages on a common record medium to provide continuous correlated indications of the magnitudes thereof.

16. A simultaneous penetrative radiation well logging and collar locating system, comprising a subsurface unit, a single conductor cable for lowering said unit into a cased borehole, a source of neutrons included in said unit for bombarding with neutrons the formations traversed by said unit, first detector means included in said unit and operative to produce signals in response to radiations incoming thereto due to said neutron bombardment, second detector means included in said unit and operative to produce signals in response to gamma rays naturally emanating from the formations traversed by said borehole, means including the single conductor of said cable for supplying alternating current to said unit from the earth's surface, collar locating means in said unit and energized by said alternating current for producing a continuous collar locating voltage related to changes in the effective thickness of the borehole casing adjacent said unit, means for continuously impressing the signals from both said detector means and said collar locating voltage on said cable without interference therebetween, whereby said unit may be stopped or moved through the borehole at relatively high speeds without causing said collar locating voltage to mask detector signals resulting from relatively thin layers in the formations, means at the earth's surface coupled to the single conductor of said cable for separating said detector signals and said collar locating voltage each from the other, and means for recording said separated signals and collar locating voltage on a common record medium to provide continuous correlated indications of the magnitudes thereof.

17. A simultaneous penetrative radiation well logging system, comprising a subsurface unit, a cable for lowering said unit into a borehole, first detector means in said unit responsive to first radiations incoming to said unit, second detector means in said unit responsive to second radiations incoming to said unit, means for deriving from the output of said first detector means first pulses of one predetermined wave form, means for deriving from the output of said second detector means second pulses having a different wave form, means for impressing both said first and second pulses on one conductor of said cable, time derivative means at the earth's surface for converting said first pulses into corresponding pulses which are predominantly positive and for converting said second pulses into corresponding pulses which are predominantly negative, means responsive only to said predominantly positive pulses for producing a voltage having an amplitude proportional to the rate of occurrence thereof, means responsive only to said predominantly negative pulses for producing a voltage proportional to the rate of occurrence thereof, and means for recording both said voltages, thereby to provide correlated indications of the intensities of said first and second radiations within the borehole.

18. A simultaneous penetrative radiation well logging system, comprising a subsurface unit, a cable for lowering said unit into a borehole, a source of radiations in said unit for bombarding the formations traversed by said unit, first detector means in said unit and responsive to first radiations incoming to said unit, second detector means in said unit and responsive to second radiations incoming to said unit, at least one of said first and second radiations resulting from bombardment of the formations by said source, means for deriving from the output of said first detector means first pulses having a predetermined wave form, means for deriving from the output of said second detector means second pulses having a different wave form, a common power supply in said unit for both said detector means, means including one conductor of said cable for transmitting alternating current to said power supply from the earth's surface, means for impressing said first and second pulses on said one conductor of said cable, time derivative means at the earth's surface for separating said first and second pulses from the alternating current on said cable, converting said first pulses into corresponding pulses which are predominantly positive and converting said second pulses into corresponding pulses which are predominantly negative, means responsive only to said predominantly positive pulses for producing a voltage having an amplitude proportional to the rate of occurrence thereof, means responsive only to said predominantly negative pulses for producing a voltage proportional to the rate of occurrence thereof, and means for recording both said voltages, thereby to provide correlated indications of the intensities of said first and second radiations within the borehole.

19. A simultaneous penetrative radiation well logging system, comprising a subsurface unit, a cable for lowering said unit into a borehole, first detector means included in said unit and operative to produce pulses predominantly of one polarity in response to first radiations incoming to said unit, second detector means included in said unit and operative to produce pulses predominantly of the opposite polarity in response to second radiations incoming to said unit, means for transmitting pulses from both said first and second detector means over a single conductor of said cable to the earth's surface, surface equipment comprising a first pulse detector channel for pulses of said one polarity and including means responsive to the pulses traversing said first channel for producing a voltage having an amplitude proportional to the rate of occurrence of pulses in said first channel, and a second pulse detector channel for pulses of said opposite polarity and including means responsive to the pulses traversing said second channel for producing a voltage having an amplitude proportional to the rate of occurrence of pulses in said second channel, gain control means included in each of said first and second channels for standardizing the amplitude of said pulses, thereby to prevent interaction between said first and second channels, and means for recording both of said voltages to provide correlated logs of variations of said first and second radiations within the borehole.

20. In a penetrative radiation well logging system of the type having a subsurface unit, a cable for lowering said unit into a borehole and a source of radiations in said unit for bombarding the formations traversed by said unit, the method of simultaneously logging radiations resulting from bombardment of the formations by said source and gamma rays naturally emanating from the formations, which comprises the steps of detecting within said unit first radiations incoming thereto and resulting from bombardment of the formations by said source, deriving a first electrical signal from said first detected radiations, detecting within said unit and at a predetermined distance from said source gamma rays naturally emanating from the formations, attenuating gamma rays resulting from said radiation source in the well fluid which surrounds said unit within the borehole so that gamma rays resulting from said radiation source are not detected at said predetermined distance, deriving a second electrical signal from said detected natural gamma rays, transmitting both said first and second electrical signals over said cable to the earth's surface, and recording at the earth's surface said first and second electrical signals to provide continuous logs of said detected first radiations and said detected natural gamma rays.

21. In a penetrative radiation well logging system of the type having a subsurface unit, a cable for lowering said unit into a borehole and a source of neutrons and gamma rays in said unit for bombarding the formations traversed by said unit, the method of simultaneously logging radiations resulting from bombardment of the formations by neutrons from said source and gamma rays naturally emanating from the formations, which comprises the steps of detecting within said unit first radiations incoming thereto and resulting from neutron bombardment of the formations by said source, deriving a first electrical signal from said first detected radiations, detecting within said unit and at a predetermined distance from said source gamma rays naturally emanating from the formations, attenuating within the well fluid which surrounds said unit in the borehole gamma rays due to said neutron source so that said gamma rays due to said source are not detected at said predetermined distance, deriving a second electrical signal from said detected natural gamma rays, transmitting both said first and second electrical signals over said cable to the earth's surface, and recording at the earth's surface said first and second electrical signals to provide continuous logs of said detected first radiations and said detected natural gamma rays.

22. In a penetrative radiation well logging system, means for substantially equalizing the amplitude of radiation pulses transmitted to the earth's surface, comprising a variable amplification circuit provided with an input circuit, means for supplying said pulses to said input circuit, and means for changing the amplification of said amplification circuit in accordance with changes in the amplitude of said pulses, said last named means including a peak rectifier device for rectifying said radiation pulses to provide a unidirectional control voltage suitable for controlling said amplification circuit.

23. A simultaneous penetrative radiation well logging system, comprising a subsurface unit, a cable for lowering said unit into a borehole, first detector means included in said unit and operative to produce pulses predominantly of one polarity in response to first radiations incoming to said unit, second detector means included in said unit and operative to produce pulses predominantly of the opposite polarity in response to second radiations incoming to said unit, first coupling means in said unit for impressing said pulses of said one polarity on one conductor of said cable, second coupling means in said unit for impressing said pulses of opposite polarity on said one conductor of said cable, damping means common to both said first and second coupling means for preventing self oscillation thereof, pulse polarity responsive means at the earth's surface for separating said pulses, and means responsive to said separated pulses for producing a continuous graph of variations of said first and second radiations within the borehole.

24. A simultaneous penetrative radiation well logging system, comprising a subsurface unit, a cable for lowering said unit into a borehole, first detector means included in said unit and operative to produce pulses predominantly of one polarity in response to first radiations incoming to said unit, second detector means included in said unit and operative to produce pulses predominantly of the opposite polarity in response to second radiations incoming to said unit, means including one conductor of said cable for supplying alternating current power to said unit, means for transmitting pulses of both polarities over said one conductor of said cable to the earth's surface, means at the earth's surface and including a circuit for separating said pulses from the alternating current wave impressed on said one conductor without the production of substantial ringing transients, means for separating the pulses of different polarities passed by said circuit, and means responsive to said separated pulses for simultaneously producing a continuous indication of variations of said first and second radiations within the borehole.

25. A simultaneous penetrative radiation well logging system comprising a subsurface unit, a cable for lowering said unit into a borehole, first detector means included in said unit and operative to produce pulses of one polarity in response to first radiations incoming to said unit, second detector means included in said unit and operative to produce pulses of the opposite polarity in response to second radiations incoming to said unit, means including one conductor of said cable for supplying alternating current to said unit, means for transmitting pulses from both said detector means over said one conductor to the earth's surface, means at the earth's surface and including high pass filter means for separating said pulses from the alternating current wave impressed on said one conductor, said filter means passing pulses from said detector means without the production of substantial ringing transients, means for separating the pulses of different polarities passed by said filter means, and means responsive to said separated pulses for logging variations in said first and second radiations within the borehole.

26. A penetrative radiation well logging system, comprising a subsurface unit, a cable for lowering said unit into a borehole, a radiation detector in said unit and operative to produce signals in response to radiations intercepted thereby, means including one conductor of said cable for supplying alternating current power to said unit, a power supply circuit included in said unit for rectifying said alternating current to provide a substantially unidirectional operating potential for said radiation detector, means for preventing rectifier transients produced in said power supply circuit from being impressed upon said one conductor of said cable, means for transmitting signals from said radiation detector over said one conductor of said cable to the earth's surface, and means at the earth's surface for logging said signals transmitted over said one conductor.

27. A simultaneous penetrative radiation well logging and collar locating system, comprising a subsurface unit, a cable for lowering said unit into a cased borehole, a source of neutrons included in said unit for bombarding with neutrons the formations traversed by said unit, first detector means included in said unit and operative to produce signals in response to radiations incoming thereto due to said neutron bombardment, second detector means included in said unit and operative to produce signals in response to gamma rays naturally emanating from the formations traversed by said borehole, collar locating means in said unit for producing a collar locating voltage which varies in accordance with changes in the thickness of the borehole casing adjacent said unit as said unit is moved through the casing, means for continuously impressing the signals from both said detector means and said collar locating voltage on one conductor of said cable without interference therebetween, whereby said unit may be stopped or moved through the borehole at relatively high speeds without causing said collar locating voltage to mask detector signals resulting from relatively thin layers in the formations, means at the earth's surface coupled to said one conductor of said cable for separating said detector signals and said collar locating voltage each from the other, and means for recording said separated signals and collar locating voltage on a common record medium to provide continuous correlated indications of the magnitudes thereof.

28. In a penetrative radiation well logging system of the type having a subsurface unit, a cable for lowering said unit into a cased borehole and a source of radiations in said unit for bombarding the formations traversed by said unit, the method of simultaneously logging in correlation with depth radiations resulting from bombardment of the formations by said source and gamma rays naturally emanating from the formations, which comprises the steps of detecting within said unit first radiations incoming thereto and resulting from bombardment of the formations by said source, deriving a first electrical signal from said first detected radiations, detecting within said unit and at a predetermined distance from said source gamma rays naturally emanating from the formations, attenuating gamma rays resulting from said radiation source in the well material which surrounds said unit within the borehole so that gamma rays due to said radiation source are of negligible effect in the detection of said natural gamma rays at said predetermined distance, deriving a second electrical signal from said detected natural gamma rays, developing within said unit a collar locating voltage which varies in accordance with changes in the effective thickness of the borehole casing adjacent said unit as said unit is moved along the casing, transmitting both said first and second electrical signals and said collar locating voltage over said cable to the earth's surface, and recording at the earth's surface said first and second electrical signals and said collar locating voltage to provide continuous logs of said detected first radiations and said detected natural gamma rays in correlation with depth.

29. The method as set forth in claim 28, which includes the steps of transmitting alternating current power from the earth's surface to said unit over said cable, rectifying said alternating current within said unit to provide substantially unidirectional operating potential and utilizing the same within said unit to detect said first radiations and said natural gamma rays, and maintaining such unidirectional operating potential substantially constant despite changes in ambient temperature.

30. A penetrative radiation well logging system, comprising a subsurface unit, a cable for lowering said unit into a cased borehole, a source of radiations in said unit for bombarding the formations traversed by said unit, first detector means included in said unit for detecting within said unit first radiations incoming thereto due to bombardment of the formations by said source, means for deriving a first electrical signal representing said first detected radiations, second detector means included in said unit and positioned a predetermined distance from said source for detecting gamma rays naturally emanating from the formations, means including the well material which surrounds said unit when within the borehole for attenuating gamma rays due to said radiation source so that gamma rays due to said radiation source are of negligible effect in the detection of said natural gamma rays at said predetermined distance, means for deriving a second electrical signal representing said detected natural gamma rays, collar finder means included in said unit for developing a collar locating voltage which varies in accordance with changes in the effective thickness of the borehole casing adjacent said unit as said unit is moved through the casing, means for transmitting both said first and second electrical signals and said collar locating voltage over said cable to the earth's surface, and means for recording at the earth's surface said first and second electrical signals and said collar locating voltage to provide continuous logs of said detected first radiations and said detected natural gamma rays in correlation with depth.

31. A radiation well logging system as set forth in claim 30, wherein said first signal deriving means develops first pulses of relatively short duration and of a first characteristic, and said second signal deriving means develops second pulses of relatively short duration and of a second characteristic, and wherein said collar finder means develops voltage kicks which have a time of duration which is long as compared to the time of duration of said first and second pulses.

32. In a radiation well logging system as set forth in claim 31, a first rectifying device at the earth's surface and having a first load circuit connected thereto, a second rectifying device at the earth's surface and having a second load circuit connected thereto, means including said cable for supplying said first pulses to said first rectifying device and said second pulses to said second rectifying device, means including a first integration network for deriving from said first load circuit a first output voltage having an amplitude which varies in accordance with the rate of occurrence of said first pulses, means including a second integration network for deriving from said second load circuit a second output voltage having an amplitude which varies in accordance with the rate of occurrence of said second pulses, and means for varying the time constant of said first and second networks to provide optimum smoothing of said first and second output voltages.

33. A radiation and collar position logging system comprising a subsurface unit, a cable for lowering said unit into a borehole and a source of radiations in said unit for bombarding the formations traversed by said unit, means including said cable for supplying alternating current to a power supply circuit in said unit, first radiation detector means included in said unit and operative to produce first pulses of relatively short duration and of a first characteristic in response to first radiations intercepted thereby, second radiation detector means included in said unit and operative to produce second pulses of relatively short duration and of a second characteristic in response to second radiations intercepted thereby, collar finder means included in said unit and operative to produce voltage kicks in response to traversal of casing collars by said unit, said voltage kicks having a time of duration which is long compared to the time of duration of said first pulses and of said second pulses and as compared to the period of said alternating current power, means including said cable for transmitting said first pulses, said second pulses and said voltage kicks to the earth's surface, means outside said subsurface unit for separating said first and second pulses from said voltage kicks and from said alternating current, means outside said subsurface unit for separating said first pulses from said second pulses, means for converting said first pulses into corresponding pulses of uniform amplitude and duration, means responsive to the pulses produced by said last named means for producing a first output voltage having an amplitude which varies in accordance with the rate of occurrence of said first pulses, means for converting said second pulses into corresponding pulses of uniform amplitude and duration, means responsive to the pulses produced by said last named means for producing a second output voltage having an amplitude which varies in accordance with the rate of occurrence of said second pulses, and means for recording said first and second output voltages and said collar finder voltage kicks on a common chart so as to provide correlated representation of said first radiation and said second radiation and said casing collars.

34. A radiation well logging system as set forth in claim 33, wherein each of said output voltage producing means includes a multimesh low pass filter having a plurality of sections, each of said sections including one resistive and one reactive element, and unicontrol operating means for simultaneously varying the low pass characteristic of said filter sections.

References Cited in the file of this patent

UNITED STATES PATENTS

| | | |
|---|---|---|
| 2,323,634 | Van Slooten et al. | July 6, 1943 |
| 2,390,433 | Fearon | Dec. 4, 1945 |
| 2,405,572 | Friedman | Aug. 13, 1946 |
| 2,433,554 | Herzog | Dec. 30, 1947 |
| 2,434,297 | Test et al. | Jan. 13, 1948 |
| 2,469,463 | Russell | May 10, 1949 |
| 2,481,014 | Herzog | Sept. 6, 1949 |
| 2,487,058 | Krasnow et al. | Nov. 8, 1949 |
| 2,504,888 | Siegert et al. | Apr. 18, 1950 |
| 2,508,772 | Pontecorvo | May 23, 1950 |
| 2,540,588 | Long | Feb. 6, 1951 |
| 2,554,844 | Swift | May 29, 1951 |
| 2,558,427 | Fagan | June 26, 1951 |
| 2,579,633 | Wadzinski | Dec. 25, 1951 |
| 2,597,630 | French | May 20, 1952 |
| 2,670,442 | Herzog | Feb. 23, 1954 |